(12) United States Patent
Haga et al.

(10) Patent No.: US 8,582,204 B2
(45) Date of Patent: Nov. 12, 2013

(54) OPTICAL FILM AND METHOD FOR MANUFACTURING THE SAME, ANTIGLARE FILM, POLARIZER WITH OPTICAL LAYER, AND DISPLAY APPARATUS

(75) Inventors: Yumi Haga, Miyagi (JP); Tsutomu Nagahama, Miyagi (JP); Shinichi Matsumura, Miyagi (JP)

(73) Assignee: Sony Corporation, Tokyo (JP)

( * ) Notice: Subject to any disclaimer, the term of this patent is extended or adjusted under 35 U.S.C. 154(b) by 786 days.

(21) Appl. No.: 12/672,640

(22) PCT Filed: Jun. 3, 2009

(86) PCT No.: PCT/JP2009/060572
§ 371 (c)(1),
(2), (4) Date: Feb. 8, 2010

(87) PCT Pub. No.: WO2009/151067
PCT Pub. Date: Dec. 17, 2009

(65) Prior Publication Data
US 2012/0008206 A1  Jan. 12, 2012

(30) Foreign Application Priority Data

Jun. 9, 2008 (JP) ................................ 2008-151140
Aug. 13, 2008 (JP) ................................ 2008-208796

(51) Int. Cl.
*G02B 5/30* (2006.01)
*B05D 5/06* (2006.01)
*D06N 7/00* (2006.01)

(52) U.S. Cl.
USPC ........................ 359/488.01; 427/162; 428/147

(58) Field of Classification Search
USPC ............ 359/488.01, 599, 707; 428/147, 206; 427/162
See application file for complete search history.

(56) References Cited

U.S. PATENT DOCUMENTS

2009/0052043 A1   2/2009  Iwata et al.
2010/0097705 A1*  4/2010  Furui et al. .................... 359/599

FOREIGN PATENT DOCUMENTS

| JP | 04-175727 | 6/1992 |
| JP | 07-290652 | 11/1995 |
| JP | 09-306366 | 11/1997 |
| JP | 2000-47010 | 2/2000 |
| JP | 2007-298996 | 11/2007 |
| WO | 2006-0088205 | 8/2006 |

OTHER PUBLICATIONS

International Search Report dated Sep. 3, 2009, for corresponding Patent Application PCT/JP2009/060572.

* cited by examiner

*Primary Examiner* — William Choi
(74) *Attorney, Agent, or Firm* — K&L Gates LLP

(57) ABSTRACT

An antiglare film includes a base member and an optical layer provided on the base member, and the optical layer has an irregular shape on a surface thereof. The irregular shape is obtained by applying a coating material containing fine particles and a resin onto the base member, distributing the fine particles densely in some portions and sparsely in other portions by convection that occurs in the coating material, and curing the coating material. The resin contains 3% by weight or more and 20% by weight or less of a polymer, the average particle diameter of the fine particles is 2 μm or more and 8 μm or less, and the average film thickness of the optical layer is 8 μm or more and 18 μm or less.

12 Claims, 19 Drawing Sheets

OPTICAL FILM AND METHOD FOR MANUFACTURING THE SAME, ANTIGLARE FILM, POLARIZER WITH OPTICAL LAYER, AND DISPLAY APPARATUS

CROSS REFERENCE TO RELATED APPLICATIONS

The present application is a National Stage of International Application No. PCT/JP2009/060572 filed on Jun. 3, 2009 and which claims priority to Japanese Patent Application No. 2008-151140 filed on Jun. 9, 2008, Japanese Patent Application No. 2008-208796 filed on Aug. 13, 2008, the entire contents of which are being incorporated herein by reference.

BACKGROUND

The present disclosure relates to an optical film and a method for manufacturing the same, an antiglare film, a polarizer with an optical layer, and a display apparatus. In particular, it relates to an antiglare film used in a display surface of a display apparatus such as a liquid crystal display apparatus.

In display apparatuses (displays) such as liquid crystal display apparatuses, a technology is adopted in which an antiglare property is imparted and reflection due to surface reflection is reduced by providing antiglare films at the display surface side to diffuse light with the films. In conventional antiglare films, the antiglare property is imparted by an irregular shape provided on the surface thereof.

FIG. 1 shows the structure of a conventional antiglare film 101. As shown in FIG. 1, the antiglare film 101 includes a base member 111 and an antiglare layer 112 provided on the base member 111. The antiglare layer 112 contains fine particles 113. These fine particles 113 protrude from the surface of the antiglare layer 112, whereby an irregular shape is formed on the surface. This antiglare film 101 is formed by applying a coating material containing the fine particles 113 such as irregular-shaped silica fine particles or organic fine particles onto the base member 111 and drying the coating material. According to such an antiglare film having the above-described structure, the fine particles 113 protruding from the antiglare layer 112 scatter light incident on the antiglare layer 112, and thus reflection due to surface reflection is reduced.

Hitherto, investigations have been conducted on an irregular shape for effectively imparting the antiglare property to antiglare films. For example, Japanese Patent No. 3,821,956 has proposed that a center-line mean roughness and a mean peak-valley spacing of the irregular shape be selected from the range of 0.08 to 0.5 µm and the range of 20 to 80 µm, respectively, in order to prevent glare. In addition, Japanese Patent No. 3,374,299 has proposed that, in order to realize good antiglare property, rough irregularities and fine irregularities are provided in which the center-line mean roughness Ra and the mean spacing Sm of the surface having these irregularities thereon are controlled to 0.1 to 1.0 µm and 20 to 120 µm, respectively, the center-line mean roughness Ra and the mean spacing Sm of the rough irregularities are controlled to 0.5 to 1.5 µm and 100 to 300 µm, respectively, and the center-line mean roughness Ra and the mean spacing Sm of the fine irregularities are controlled to 0.05 to 0.5 µm and 20 to 70 µm, respectively.

However, both the above-described proposals aim to scatter light in a wide angle range. The irregular shape of the surface has a minute period and the surface profile has steep angle components. Consequently, there is a problem that the entire screen of a display apparatus appears whitish brown, that is, the contrast is decreased.

One approach to solve this problem is to increase the period of the irregular shape of the surface. However, if the period is increased in this manner, it becomes impossible to prevent reflection. That is, the contrast and the antiglare property are incompatible properties and it is difficult to satisfy these two properties at the same time.

Also, in some cases, front surface plates for the purpose of providing mechanical, thermal, and weathering protections and a design function are arranged on the front surface (the viewer's side) of, for example, liquid crystal displays, organic EL displays, and other display apparatuses. In such cases, when a rear surface (display apparatus side) of a front surface plate is flat and if, for example, the front surface plate is deflected and comes close to the display apparatus, a problem of occurrence of Newton rings occurs.

Furthermore, in the cases where another rear surface member is arranged at the rear surface side of a display apparatus, problems of deflection of members become severe, resulting in the problem of the occurrence of Newton rings. This is because the space between the display apparatus and the rear side member is narrowed with a reduction in the thickness of the display apparatus, and in addition, the size of the display apparatus is increasing. A description will be made using a liquid crystal display as an example. For example, in a liquid crystal display, a diffusing plate that makes the illuminance of light emitted from a light source uniform in a plane, a lens film for controlling the viewing angle, and a polarization separation reflective film that polarizes and separates light for reuse, and the like are arranged as the rear surface members. However, a polarizing plate disposed at the rear surface side of a liquid crystal panel and in front of these rear surface members usually has a flat surface profile (center-line mean roughness Ra=less than 0.03 µm, and root-mean-square slope RΔq=less than 0.01). Thus, occurrence of Newton rings has been a problem in thin liquid crystal displays.

Consequently, an optical film that can suppress occurrence of such Newton rings has been desired.

Accordingly, it is desirable to provide an optical film and a method for manufacturing the same, an antiglare film, a polarizer with an optical layer, and a display apparatus that can achieve both good contrast and antiglare property.

Furthermore, it is desirable to provide an optical film and a method for manufacturing the same, an antiglare film, a polarizer with an optical layer, and a display apparatus that can achieve both good antiglare property and image clarity and that can also suppress occurrence of Newton rings.

SUMMARY

Both good antiglare property and contrast can be achieved not by surface scattering caused by individual particles protruding from a surface but by surface scattering caused by an irregular shape which has a long and gentle period and controlled angle components.

To solve the above-described problems, a first embodiment provides an antiglare film including:
 a base member; and
 an optical layer provided on the base member,
 wherein the optical layer has an irregular shape on a surface thereof,
 the irregular shape is obtained by applying a coating material containing fine particles and a resin onto the base member, distributing the fine particles densely in some portions and sparsely in other portions by convection that occurs in the coating material, and curing the coating material,
 the resin contains 3% by weight or more and 20% by weight or less of a polymer, the average particle diameter of the fine particles is 2.4 μm or more and 8 μm or less, and the average film thickness of the optical layer is 6.4 μm or more and 18 μm or less.

A second embodiment provides a method for manufacturing an antiglare film, including the steps of:

applying a coating material containing fine particles and a resin onto a base member;

drying the coating material to generate convection in the coating material and distributing the fine particles densely in some portions and sparsely in other portions by the convection; and curing the coating material in which the fine particles are distributed densely in some portions and sparsely in other portions to form an optical layer, wherein the resin contains 3% by weight or more and 20% by weight or less of a polymer, the average particle diameter of the fine particles is 2.4 μm or more and 8 μm or less, and the average film thickness of the optical layer is 6.4 μm or more and 18 μm or less.

A third embodiment provides an antiglare film including:

a base member; and an antiglare layer provided on the base member, wherein the antiglare layer has an irregular shape on a surface thereof, the irregular shape is obtained by applying a coating material containing fine particles and a resin onto the base member, distributing the fine particles densely in some portions and sparsely in other portions by convection that occurs in the coating material, and curing the coating material, the resin contains 3% by weight or more and 20% by weight or less of a polymer, the average particle diameter of the fine particles is 2.4 μm or more and 8 μm or less, and the average film thickness of the antiglare layer is 8 μm or more and 18 μm or less.

A fourth embodiment provides a polarizer with an optical layer, including:

a polarizer; and an optical layer provided on the polarizer, wherein the optical layer has an irregular shape on a surface thereof, the irregular shape is obtained by applying a coating material containing fine particles and a resin, distributing the fine particles densely in some portions and sparsely in other portions by convection that occurs in the coating material, and curing the coating material, the resin contains 3% by weight or more and 20% by weight or less of a polymer, the average particle diameter of the fine particles is 2.4 μm or more and 8 μm or less, and the average film thickness of the optical layer is 6.4 μm or more and 18 μm or less.

A fifth embodiment provides a display apparatus including:

a display unit that displays an image; and an optical layer provided on a display surface side of the display unit, wherein the optical layer has an irregular shape on a surface thereof, the irregular shape is obtained by applying a coating material containing fine particles and a resin, distributing the fine particles densely in some portions and sparsely in other portions by convection that occurs in the coating material, and curing the coating material, the resin contains 3% by weight or more and 20% by weight or less of a polymer, the average particle diameter of the fine particles is 2.4 μm or more and 8 μm or less, and the average film thickness of the optical layer is 6.4 μm or more and 18 μm or less.

A sixth embodiment provides a display apparatus including:

a display unit that displays an image;

a front surface member provided on a front surface side of the display unit; and an optical layer provided on at least one of the front surface side of the display unit and a rear surface side of the front surface member, wherein the optical layer has an irregular shape on a surface thereof, the irregular shape is obtained by applying a coating material containing fine particles and a resin, distributing the fine particles densely in some portions and sparsely in other portions by convection that occurs in the coating material, and curing the coating material, the resin contains 3% by weight or more and 20% by weight or less of a polymer, the average particle diameter of the fine particles is 2.4 μm or more and 8 μm or less, and the average film thickness of the optical layer is 6.4 μm or more and 18 μm or less.

A seventh embodiment provides a display apparatus including:

a display unit that displays an image;

a rear surface member provided on a rear surface side of the display unit; and an optical layer provided on at least one of the rear surface side of the display unit and a front surface side of the rear surface member, wherein the optical layer has an irregular shape on a surface thereof, the irregular shape is obtained by applying a coating material containing fine particles and a resin, distributing the fine particles densely in some portions and sparsely in other portions by convection that occurs in the coating material, and curing the coating material, the resin contains 3% by weight or more and 20% by weight or less of a polymer, the average particle diameter of the fine particles is 2.4 μm or more and 8 μm or less, and the average film thickness of the optical layer is 6.4 μm or more and 18 μm or less.

In the present embodiments, the surface profile is formed by a particle distribution formed by drying, and curing by irradiation of ionizing radiation or heat after the drying. That is, a desired surface roughness can be achieved by controlling the distribution of the fine particles (sparseness and denseness of particles) and the cure shrinkage ratio of the resin.

As for the distribution of the fine particles, in a portion where fine particles are densely present, the ratio of the resin is low and these fine particles inhibit curing, and thus cure shrinkage is small. In contrast, in a portion where fine particles are sparsely present, the ratio of the resin is high and thus the cure shrinkage of the resin is large. Because of the difference in cure shrinkage ratio between these former and latter portions, moderate irregularities are formed on the surface of the coating material, and the surface of the optical layer or the surface of the antiglare layer exhibits an antiglare property.

Controlling the cure shrinkage ratio is particularly important. According to the experiments, when a polymer is incorporated in an amount of 3% by weight to 20% by weight, preferably 5% by weight to 15% by weight relative to the total amount of resin, an adequate degree of cure shrinkage is achieved whereby desired irregularities can be formed on the surface. If the polymer content is less than 3% by weight, the cure shrinkage is large and thus the roughness of the surface is increased. Consequently, the root-mean-square slope R$\Delta$q and the arithmetic mean roughness Ra are increased, resulting in an increase in the opacity. Furthermore, in the present embodiment, a polymer is added in order to adjust the cure shrinkage as described above. However, if the polymer is excessively added in an amount of more than 20% by weight, that is, if the ratio of substances that inhibit curing in the resin increases, the viscosity of the coating material increases. As a result, the dispersibility of the fine particles is degraded, and sparseness and denseness of the fine particles become clearly identified more than necessary. Consequently, the difference in cure shrinkage notably appears between the sparse and dense portions, and the opacity increases. Furthermore, if the polymer is excessively added in an amount of more than 20% by weight, the hardness of the coating film significantly decreases.

The optical films of the present embodiment have high transmission clarity, though they have an irregular shape on the surface thereof. Therefore, the optical films of the present embodiment can be arranged on a front surface a display apparatus and used as antiglare layers or antiglare films. Furthermore, they can be also used as anti-Newton ring layers or anti-Newton ring films.

As described above, according to the present embodiment, both good contrast and antiglare property, which are incompatible properties, can be achieved.

Additional features and advantages are described herein, and will be apparent from, the following Detailed Description and the figures.

DETAILED DESCRIPTION

Embodiments will now be described with reference to the drawings. Note that, in all drawings illustrating the embodiments described below, the same or corresponding components are assigned the same characters.

(1) First Embodiment (1-1) Structure of Liquid Crystal Display Apparatus

Figure 2:
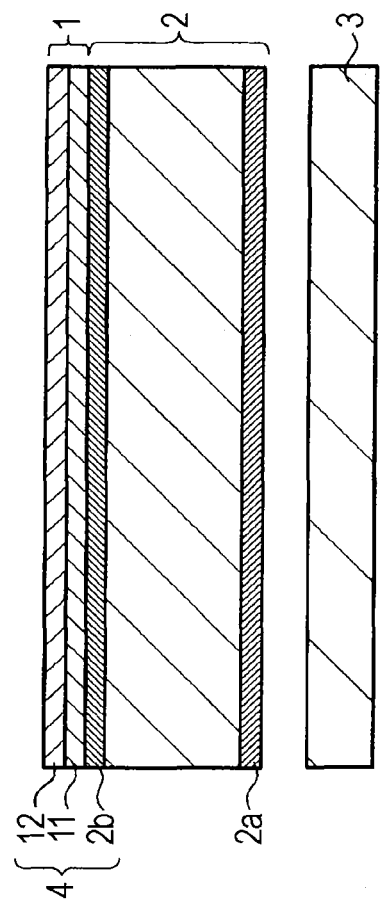
FIG. 2 is a schematic cross-sectional view showing one example of the structure of a liquid crystal display apparatus according to a first embodiment.

FIG. 2 shows one example of the structure of a liquid crystal display apparatus according to a first embodiment. As shown in FIG. 2, the liquid crystal display apparatus includes a backlight 3 that emits light and a liquid crystal panel 2 that temporally and spatially modulates light emitted from the backlight 3 to display an image. Polarizers 2a and 2b are respectively provided on two surfaces of the liquid crystal panel 2. An antiglare film 1 is provided on the polarizer 2b provided at the display surface side of the liquid crystal panel 2. In the present invention, the polarizer 2b having the antiglare film 1 or an antiglare layer on one main surface thereof is referred to as an antiglare polarizer 4.

For example, a direct-type backlight, an edge-type backlight, or a planar light source-type backlight can be used as the backlight 3. The backlight 3 includes, for example, a light source, a reflecting plate, an optical film, and the like. For example, a cold cathode fluorescent lamp (CCFL), a hot cathode fluorescent lamp (HCFL), an organic electroluminescence (OEL), an inorganic electroluminescence (IEL), a light emitting diode (LED), or the like is used as the light source.

Examples of the display mode that can be used for the liquid crystal panel 2 include a twisted nematic (TN) mode, a super twisted nematic (STN) mode, a vertically aligned (VA) mode, an in-plane switching (IPS) mode, an optically compensated birefringence (OCB) mode, a ferroelectric liquid crystal (FLC) mode, a polymer dispersed liquid crystal (PDLC) mode, and a phase change guest host (PCGH) mode.

The polarizers 2a and 2b are respectively provided on two surfaces of the liquid crystal panel 2 so that transmission axes thereof are orthogonal to each other, for example. Each of the polarizers 2a and 2b allows only one of orthogonal polarized components of incident light to pass and blocks the other component by absorption. Each of the polarizers 2a and 2b may be a uniaxially stretched hydrophilic polymer film such as a polyvinyl alcohol film, a partially formalized polyvinyl alcohol film, an ethylene-vinyl acetate copolymer partially saponified film, or the like, with a dichroic substance, such as iodine or a dichroic dye, adsorbed thereto.

(1-2) Structure of Antiglare Film

Figure 3:
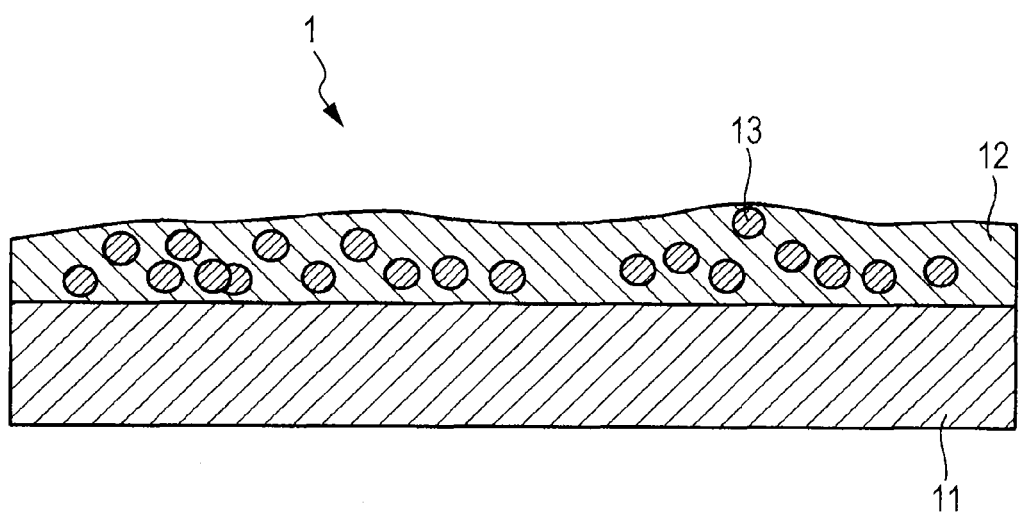
FIG. 3 is an enlarged cross-sectional view showing one example of the structure of an antiglare film according to the first embodiment.

FIG. 3 shows one example of the structure of the antiglare film 1 according to the first embodiment. As shown in FIG. 3, the antiglare film 1 includes a base member 11 and an antiglare layer 12 provided on the base member 11. The antiglare layer 12 contains fine particles 13, and fine irregularities are formed on the surface of the antiglare layer 12.

The surface haze is preferably 0% to 5%, and more preferably 0% to 1%. When the surface haze is 5% or less, the feeling of opacity is reduced. When the surface haze is 1% or less, the feeling of opacity hardly occurs. Note that the surface haze is a value measured by detecting surface scattering. The higher the surface haze, the higher the opacity. On the other hand, the internal haze is not particularly limited and is determined by the fine particles 13 contained in the antiglare layer 12, and the like.

The total haze is preferably 3% to 45%, more preferably 3% to 40%, and most preferably 3% to 30%. In the range of 3% to 45%, an adequate degree of antiglare property can be achieved without decreasing the image clarity. That is, if the total haze is less than 3%, it is difficult to achieve a sufficient antiglare property. If the total haze exceeds 45%, the image clarity is decreased. Note that the total haze is the sum of the surface haze and the internal haze.

Furthermore, the opacity measured by bonding a black acrylic plate on the rear surface of the antiglare film 1 is preferably 1.1 or less and more preferably 0.9 or less. When the opacity is 1.1 or less, the decrease in contrast can be suppressed. When the opacity is 0.9 or less, good contrast can be realized.

(Base Member)

For example, a plastic film having transparency can be used as the material for the base member 11. For example, known polymer films can be used as the material for the transparent plastic film. Specific examples of the known polymer films include triacetyl cellulose (TAC), polyesters (TPEE), polyethylene terephthalate (PET), polyimides (PI), polyamides (PA), aramids, polyethylene (PE), polyacrylates (PAR), polyethersulfone, polysulfone, polypropylene (PP), diacetyl cellulose, polyvinyl chloride, acrylic resins (PMMA), polycarbonate (PC), epoxy resins, urea resins, urethane resins, and melamine resins. The thickness of the base member 11 is preferably 38 µm to 100 µm from the standpoint of productivity but is not particularly limited to this range.

(Antiglare Layer)

The antiglare layer 12 includes fine particles 13 and a resin. The fine particles 13 are distributed densely in some portions and sparsely in other portions in the antiglare layer 12. Furthermore, the antiglare layer 12 may contain, as additives, a photostabilizer, an ultraviolet absorber, an antistatic agent, a flame retardant, an antioxidant, and the like, if necessary.

The fine particles 13 are preferably covered with the resin on the surface of the antiglare layer 12. Covering the fine particles 13 in this manner prevents protrusion of the fine particles 13 from the antiglare layer 12 and formation of high-angle components derived from the curvatures of the fine particles themselves on the surface, and thus can suppress an increase in the opacity.

When the average film thickness of the antiglare layer 12 is represented by T and the average particle diameter of the fine particles 13 is represented by D, a ratio R ($=D/T \times 100$) is preferably 30% or more and 70% or less, and more preferably 30% or more and 60% or less. If the ratio R is less than 30%, the antiglare property is degraded. If the ratio R exceeds 70%, the number of fine particles 13 present near the surface increases, resulting in an increase in the opacity and a decrease in contrast.

The average film thickness of the antiglare layer is 8 µm or more and 18 µm or less, preferably 9 µm or more and 16 µm or less, and more preferably 11 µm or more and 13 µm or less. This is because at an average film thickness of less than 8 µm, a sufficient hardness is not be obtained, and at an average film thickness exceeding 18 µm, curling significantly occurs in a step of curing the resin during manufacturing. It should be noted that if the average film thickness is less than 8 µm and a sufficient hardness is not obtained, it is difficult to provide the antiglare layer 12 on the top surface of the display apparatus.

However, in the case where the antiglare film 1 is not used on the top surface of the display apparatus, it is possible to extend the allowance of the surface hardness, and thus the average film thickness of the antiglare layer can be 6.4 µm or more and 18 µm or less. Note that, at an average film thickness of less than 6.4 µm, the hardness is further reduced and dry aggregation significantly occurs. Consequently, the surface becomes an orange peel-like surface, thereby causing glare.

For example, spherical or flat organic fine particles are used as the fine particles 13. The average particle diameter of the fine particles 13 is 2.4 µm or more and 8 µm or less, and 4 µm or more and 6 µm or less. As the average particle diameter of the fine particles 13 decreases, the number of fine particles present near the surface increases, thereby increasing the opacity by surface scattering. At an average particle diameter of less than 2.4 µm, the increase in the opacity becomes significant. At an average particle diameter exceeding 8 µm, glare cannot be suppressed in a case of the application to high-definition displays. Note that, in the present embodiment, the average particle diameter of the fine particles 13 is measured by a pore electrical resistance method.

If the average film thickness is less than 6 µm, even when the content of the polymer is 3% by weight or more and 20% by weight or less, the frequency in which the fine particles protrude from the antiglare layer increases, resulting in a decrease in contrast.

A surface profile that can achieve both good antiglare property and contrast can be formed by balancing three parameters, namely, the particle diameter of the fine particles, the average film thickness, and the amount of polymer added.

The particle diameter of the fine particles and the film thickness represent a covering state of the particles in the antiglare layer. By controlling the particle diameter of the fine particles to 2.4 µm or more and 8 µm or less and 4 µm or more and 6 µm or less and the film thickness to 8 µm or more and 18 µm or less, preferably 9 µm or more and 16 µm or less, and more preferably 11 µm or more and 13 µm or less, the protrusion of the particles from the surface is suppressed and a desired surface profile, that is, an $R\Delta q$ of 0.01 or more and 0.03 or less can be obtained. In addition, the polymer is added for the purpose of adjusting cure shrinkage. If the content of the polymer is less than 3% by weight, cure shrinkage is increased and the surface becomes roughened. That is, it becomes difficult to obtain a desired surface profile having an increased root-mean-square slope $R\Delta q$ and arithmetic mean roughness Ra. If the polymer is excessively added in an amount more than 20% by weight, the ratio of substances that inhibit curing in the resin increases and the viscosity of the coating material increases. Consequently, the dispersibility of the fine particles 13 is degraded, and sparseness and denseness of the fine particles 13 become clearly identified more than necessary. As a result, the difference in cure shrinkage notably appears between the sparse portions and the dense portions, thereby increasing the root-mean-square slope R$\Delta$q and the arithmetic mean roughness Ra.

When the three parameters, namely, the particle diameter of the fine particles, the average film thickness, and the amount of polymer added are within the range specified in claims of the present invention, a desired surface profile can be obtained and both good antiglare property and contrast can be achieved.

The amount of fine particles 13 added is preferably 8 parts by weight or more and 50 parts by weight or less, more preferably 10 parts by weight or more and 30 parts by weight or less, and further preferably 10 parts by weight or more and 20 parts by weight or less per 100 parts by weight of the resin. If the amount of fine particles 13 added is less than 8 parts by weight, sparseness and denseness of the fine particles 13 in the in-plane direction become clearly identified. Accordingly, the roughness increases and a sharp image cannot be obtained. In contrast, if the amount of fine particles 13 added exceeds 50 parts by weight, the haze increases, the value of image clarity decreases, and the image contrast of the display apparatus also decreases as a result. However, scattering of light can be suppressed by decreasing the difference in refractive index between the fine particles 13 and the matrix. Therefore, the amount of fine particles 13 added and the difference in refractive index from the matrix resin are preferably adjusted in accordance with the desired image contrast. The difference in refractive index between the refractive index of the fine particles 13 and the refractive index of the matrix is preferably 0.03 or less and more preferably 0.02 or less.

For example, acrylic particles, fine particles containing an acryl/styrene copolymer as a main component, and styrene particles can be used as the organic fine particles. However, fine particles containing an acryl/styrene copolymer as a main component is preferable, and fine particles containing, as a main component, an acryl/styrene copolymer having a refractive index of 1.50 to 1.56 are particularly preferable. This is because the fine particles 13 can be distributed densely in some portions and sparsely in other portions.

In the case where slightly polarized fine particles, such as acryl resin fine particles, are used as the fine particles 13, convection in the coating material that occurs during drying decreases. Thus, the fine particles are dispersed and a desired particle distribution is difficult to form. To overcome this problem, a solvent having a high surface tension must be used. However, such a solvent has a high boiling point and the resulting coating film is not readily dried, resulting in difficulty of handling during manufacturing. Accordingly, fine particles in which a non-polar resin, such as styrene, is blended are preferably used. As for fine particles containing an acryl/styrene copolymer as a main component, the surface energy can be changed by changing the composition ratio of the acryl and styrene in synthesis. Among fine particles containing acryl/styrene copolymers as main components, those having a mixing ratio that achieves a refractive index of 1.50 to 1.56 are particularly preferable. This is because a desired particle distribution can be achieved, and a desired surface profile can be obtained by adding a process of controlling cure shrinkage.

Even in the case where acrylic fine particles adjusted by controlling the mixing ratio of acryl resins having different structures or different numbers of functional groups without incorporating styrene are used, the particle distribution formed during drying can also be controlled by hydrophilizing or hydrophobizing the surfaces of the fine particles.

The arithmetic mean roughness Ra of the roughness profile of the surface of the antiglare layer 12 is 0.03 µm or more and 0.15 µm or less, and more preferably 0.05 µm or more and 0.12 µm or less. If the arithmetic mean roughness Ra of the roughness profile is less than 0.03 µm, the antiglare property is degraded. If the arithmetic mean roughness Ra exceeds 0.15 µm, the contrast is degraded.

Figure 4:
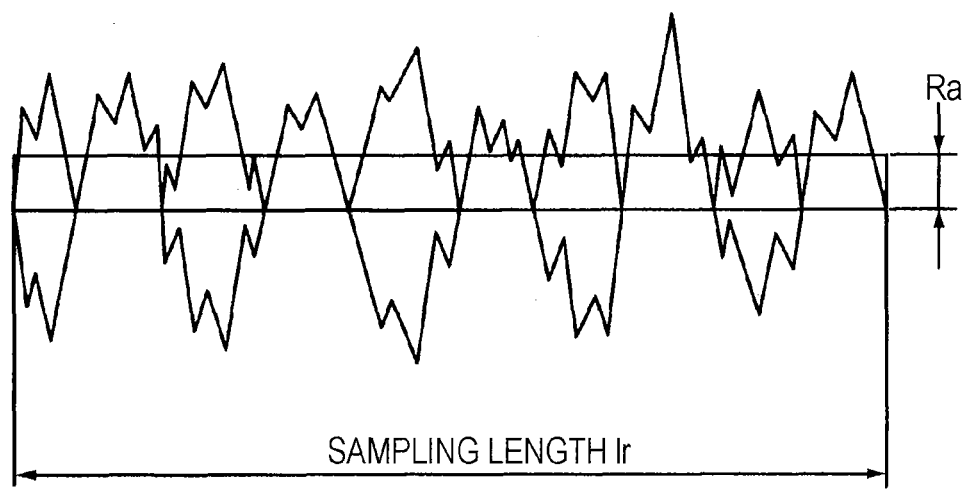
FIG. 4 is a schematic diagram for explaining the arithmetic mean roughness Ra.

FIG. 4 is a diagram for explaining the arithmetic mean roughness Ra. As shown by formula (1) below, the arithmetic mean roughness Ra is an average of the absolute value of Z(x) in a sampling length, and a smaller Ra indicates a higher smoothness. If the arithmetic mean roughness Ra is less than 0.03 µm, the surface of the antiglare layer is close to a mirror surface. This increases components that specularly reflected relative to the incident light and degrades the antiglare property. The upper limit value of the arithmetic mean roughness Ra is not particularly limited as long as the root-mean-square slope R$\Delta$q is in the range of 0.01 or more and 0.03 or less. However, according to experiments, as the arithmetic mean roughness Ra increases, the root-mean-square slope R$\Delta$q also increases at the same time. Consequently, if the arithmetic mean roughness Ra exceeds 0.15 µm, the root-mean-square slope R$\Delta$q exceeds 0.03 µm, thereby decreasing the contrast.

(Formula 1)

$$Ra = \frac{1}{lr}\int_0^{lr}\left|Z(x)\right|dx \quad (1)$$

In addition, although the value obtained by averaging the angle components of the surface is expressed by R$\Delta$q ($\theta$a) as described above, merely controlling R$\Delta$q ($\theta$a) is not sufficient. By forming a uniformly gentle surface, a higher contrast can be realized. The Ra can be used as an indicator therefor. A film having a uniformly gentle surface can be obtained by controlling R$\Delta$q in the range of 0.01 to 0.03 and Ra to 0.15 or less.

Figure 5:
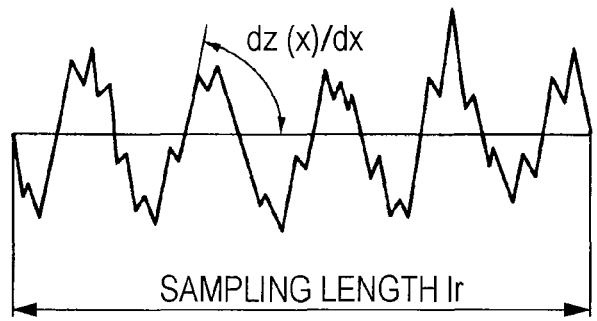
FIG. 5 is a schematic diagram for explaining the root-mean-square slope.

FIG. 5 is a schematic diagram for explaining the root-mean-square slope. The root-mean-square roughness R$\Delta$q of the roughness profile is a parameter obtained by averaging slopes in a micro-region and is represented by formula (2) below.

R$\Delta$q (or Rdq): root-mean-square slope of the roughness profile

P$\Delta$q (or Pdq): root-mean-square slope of the primary profile

W$\Delta$q (or Wdq): root-mean-square slope of the waviness profile

Root mean square of the local slope dz/dx in the sampling length (Formula 2)

$$R\Delta q, P\Delta q, W\Delta q = \sqrt{\frac{1}{lr}\int_0^{lr}\left(\frac{d}{dx}Z(x)\right)^2 dx} \quad (2)$$

The root-mean-square slope R$\Delta$q and the optical characteristics (contrast (feeling of opacity) and antiglare property) are correlated with each other. That is, the contrast and the antiglare property can be controlled by controlling the root-mean-square slope R$\Delta$q. Specifically, both good contrast and antiglare property can be achieved when the root-mean-square slope $R\Delta q$ is 0.01 or more and 0.03 or less.

The root-mean-square slope $R\Delta q$ is correlated with the feeling of opacity. Since the root-mean-square slope $R\Delta q$ is the average of the slopes in a micro-region, the surface scattering increases if the root-mean-square slope $R\Delta q$ exceeds 0.03, that is, if a steep slope is included in the components constituting the surface, and thus, the feeling of opacity increases. That is, the photopic contrast is degraded. If the $R\Delta q$ is less than 0.01 μm, the surface is close to a mirror surface, the specular reflection components increase, and thus the antiglare property is significantly degraded. A surface profile parameter similar to the root-mean-square slope $R\Delta q$ is an mean slope angle θa (JIS B 0601-1994). The mean slope angle θa is similar in that it represents a slope. However, in the above formula for determining the root-mean-square slope $R\Delta q$, the root mean square of the differential value of the micro-region is determined. Therefore, a larger angle component (which affects the opacity) is emphasized. Accordingly, the root-mean-square slope $R\Delta q$ has a higher sensitivity to the opacity than the mean slope angle θa.

The mean width RSm of the roughness profile is correlated with how the antiglare property is exhibited. The mean width of the roughness profile is the average of the lengths Xs of profile elements in the sampling length and is specifically represented by formula (3) below.

(Formula 3)

$$RSm = \frac{1}{m}\sum_{i=1}^{m} XSi \quad (3)$$

The mean width RSm of the roughness profile is preferably 0.05 mm or more and 0.2 min or less, and more preferably 0.08 mm or more and 0.15 mm or less. If the RSm is less than 0.05 mm, the antiglare property does not tend to be exhibited. If the RSm exceeds 0.2 mm, the surface tends to coarsen to an extend that is visually identifiable. By controlling the RSm in the range of 0.08 mm or more and 0.15 mm or less, good antiglare property can be exhibited even in an environment in which intense light is perpendicularly incident on a liquid crystal display apparatus.

Figure 1:
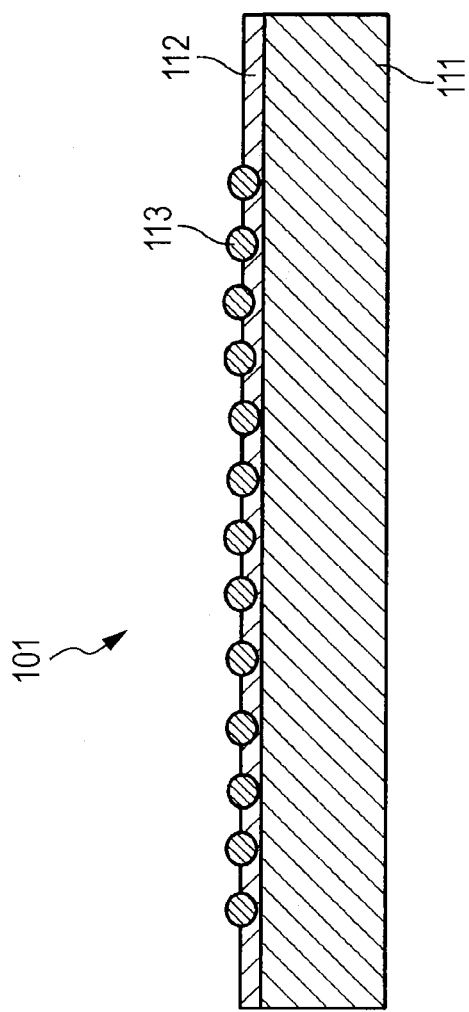
FIG. 1 is an enlarged cross-sectional view showing the structure of a conventional antiglare film.

The root-mean-square slope $R\Delta q$ of the antiglare film 1 of this first embodiment is smaller than that of conventional antiglare films. Considering that the root-mean-square slope $R\Delta q$ is a parameter determined by averaging the slopes in a micro-region, this specifically indicates the following. That is, the antiglare film 1 of this first embodiment has a continuous, gentle irregular shape as shown in FIG. 3 whereas a conventional antiglare film has an irregular shape that contains steep angle components, as shown in FIG. 1. Accordingly, the antiglare film 1 of the first embodiment can suppress scattering of light over a wide angle range and prevent a display screen from becoming opaque, whereas the conventional antiglare film scatters light over a wide angle range and thus a display screen becomes opaque. Note that in the conventional antiglare film art shown in FIG. 1, the irregular shape is determined by the particle size and the amount of protrusion of the fine particles.

As the antistatic agent, for example, an electrically conductive carbon, inorganic fine particles, inorganic fine powder, a surfactant, an ionic liquid or the like can be used. These antistatic agents may be used alone or in combinations of two or more. Examples of the materials for the inorganic fine particles and inorganic fine powder include materials containing an electrically conductive metal oxide as a main component. As the electrically conductive metal oxides, for example, tin oxide, indium oxide, antimony-doped tin oxide (ATO), indium-doped tin oxide (ITO), and antimony zinc oxide can be used. In addition, when inorganic fine particles are used as the antistatic agent, at least some fine particles of the fine particles 13 constituting the aggregates are preferably inorganic fine particles serving as the antistatic agent.

Examples of the surfactant include anionic or amphoteric compounds such as carboxylic acid compounds and phosphate salts; cationic compounds such as amine compounds and quaternary ammonium salts; nonionic compounds such as fatty acid polyhydric alcohol ester compounds and polyoxyethylene adducts; and polymer compounds such as polyacrylic acid derivatives. Ionic liquids are molten salts that are liquid at room temperature. Ionic liquids that have compatibility with the solvent and the resin and that are present in a state compatible with the resin after the solvent is volatilized in the drying step described below are preferable. In addition, ionic liquids that have a small surface active effect and do not affect the convection and aggregation of the fine particles 13 when added to the coating material are preferable. Specific examples of the cationic species of the ion pairs include aliphatic quaternary ammonium cations composed of nitrogen-containing oniums, quaternary ammonium cations having nitrogen-containing heterocyclic structures, phosphonium cations composed of phosphorus-containing onium salts, and sulfonium cations composed of sulfur-containing oniums. Examples of the anionic species of the ion pairs include halogen anions, organic carboxyl group anions, and organic fluorine-containing anions. In particular, the anion is preferably an organic fluorine-containing anion such as tris (trifluoromethylsulfonyl)nitric acid because the anion readily forms a liquid ion pair at normal temperature. Furthermore, it is preferable that the ionic liquids contain no long-chain alkyl group in the ion pair. If a long-chain alkyl group is contained in the ion pair, the surface active effect is increased and affects aggregation of the fine particles 13. In addition, a plurality of types of ionic liquids may be used in combinations.

(1-3) Method for Manufacturing Antiglare Film

Next, an example of a method for manufacturing the antiglare film 1 having the above-described structure will be described. The method for manufacturing the antiglare film 1 includes applying a coating material containing fine particles 13, a resin, and a solvent onto a base member 11, drying the solvent, and then curing the resin.

(Preparation of Coating Material)

First, for example, a resin, fine particles 13, and a solvent are mixed in a stirrer, such as a disper, or a dispersion machine, such as a bead mill, to obtain a coating material in which the file particles 13 are dispersed. In this step, a photostabilizer, an ultraviolet absorber, an antistatic agent, a flame retardant, an antioxidant, and the like may be added, if necessary. In addition, silica fine particles may further be added as a viscosity modifier.

For example, an organic solvent that dissolves the resin material used, that has good wettability with the fine particles 13, and that does not bleach the base member 11 can be used as the solvent. Examples of the organic solvent include tertiary butanol, isopropyl acetate, and the like.

The resin preferably contains 3% by weight or more and 20% by weight or less polymer and 80% by weight or more and 97% by weight or less oligomer and/or monomer, and more preferably contains 5% by weight or more and 15% by weight or less polymer and 85% by weight or more and 95% by weight or less oligomer and/or monomer relative to the total amount of resin. The polymer is added in order to adjust cure shrinkage. If the polymer content is less than 3% by weight, the cure shrinkage is large, and the surface is roughened, the root-mean-square slope RΔq and the arithmetic mean roughness Ra are increased, and the opacity is increased. In contrast, when a polymer is excessively added in an amount of more than 20% by weight, the ratio of substances that inhibit curing in the resin increases and the viscosity of the coating material increases. As a result, the dispersibility of the fine particles 13 is degraded, and sparseness and denseness of the fine particles 13 become clearly identified more than necessary. As a result, the difference in cure shrinkage notably appears between the sparse portions and the dense portions, thereby increasing the opacity. Furthermore, when a polymer is excessively added in an amount of more than 20% by weight, a decrease in the hardness of the antiglare layer 12 becomes also significant.

The Martens hardness of the antiglare layer 12 is preferably 220 N/mm$^2$ or more. When the polymer is added in an amount more than 20% by weight, it is difficult to achieve a Martens hardness of 220 N/mm$^2$ or more.

In the present invention, the Martens hardness is determined by the following evaluation method.

An antiglare layer 12 is formed on a base member 11. A portion where no fine particles 13 are present is selected, and a surface hardness is measured by an indentation method under the conditions below.

Measuring device: PICODENTOR HM-500 (Fischer Instruments K.K.)

Indenter: Vickers indenter

Maximum indentation depth: 10% or less of the average thickness of the AG layer

From the standpoint of ease of manufacturing, the resin is preferably an ionizing radiation-curable resin that is cured by ultraviolet rays or electron beams or a thermosetting resin that is cured by heat. A photosensitive resin that can be cured by ultraviolet rays is most preferable. Examples of such a photosensitive resin include acrylate resins such as urethane acrylates, epoxy acrylates, polyester acrylates, polyol acrylates, polyether acrylates, and melamine acrylates. As for characteristics after curing, a resin that exhibits good light-transmitting property in view of good image-transmitting property and a resin that has a high hardness in view of scratch resistance are particularly preferable. Such a resin can be appropriately selected. Note that the ionizing radiation-curable resin is not particularly limited to ultraviolet-curable resins, and any ionizing radiation-curable resin having a light-transmitting property can be used. However, a resin that does not cause a significant change in the hue of transmitted light and the amount of transmitted light due to coloring and haze is preferable.

Such a photosensitive resin can be obtained by blending a photopolymerization initiator with organic materials, such as monomers, oligomers, and polymers, which can form the resin. For example, a urethane acrylate resin is produced by allowing a polyester polyol to react with an isocyanate monomer or prepolymer and then allowing the resulting reaction product to react with a hydroxyl-group-containing acrylate or methacrylate monomer.

Examples of the photopolymerization initiator contained in the photosensitive resin include benzophenone derivatives, acetophenone derivatives, and anthraquinone derivatives. These may be used alone or in combinations. A component that improves coating film formation, e.g., an acrylic resin, may further be appropriately selected and blended with the photosensitive resin.

In addition, a urethane resin, an acrylic resin, a methacrylic resin, a styrene resin, a melamine resin, or a cellulosic resin that can be fixed at least by drying, an ionizing radiation-curable oligomer, or a thermosetting oligomer can be appropriately mixed with photosensitive resin and used. The hardness and curling of the antiglare layer 12 can be adjusted by appropriately mixing such resins. These resins are not limited thereto. Preferably, a polymer that has an ionizing radiation-sensitive group, such as an acrylic double bond, or a thermosetting group, such as an —OH group, can be used.

As for the coating material thus prepared, the difference in specific gravity between the fine particles 13 and the liquid component that are contained in the coating material is preferably adjusted prior to the application so as to cause an adequate settling and/or aggregation of the fine particles 13. This is because desired fine irregularities in which low-angle reflecting portions having relatively low angles of slope and wide-angle reflecting portions having slopes are mixed can be formed on the surface of the coating film after the application. Furthermore, preferably, the difference in surface tension between the fine particles 13 and resin is adjusted. This is because the shape of the cured resin connecting between fine particles 13 can be controlled during drying and curing of the resin.

(Application)

Next, the coating material obtained as described above is applied onto the base member 11. The coating material is applied so that the average film thickness after drying is preferably 8 μm or more and 18 μm or less, more preferably 9 μm or more and 16 μm or less, and further preferably 11 μm or more and 13 μm or less. This is because sufficient hardness is not achieved at an excessively small average film thickness, and curling occurs in the step of curing the resin during manufacturing at an excessively large average film thickness.

The application method is not particularly limited and any known application method can be employed. Examples of the known application methods include a micro-gravure coating method, a wire-bar coating method, a direct gravure coating method, a die coating method, a dipping method, a spray coating method, a reverse roll coating method, a curtain coating method, a comma coating method, a knife coating method, and a spin-coating method.

(Drying and Curing)

After application of the coating material, drying and curing are conducted to obtain an antiglare layer 12. In this step, an irregular shape that has a longer period and is gentle (i.e., a root-mean-square slope RΔq that is adequately small) compared with the related art is formed on the surface of the antiglare layer 12. In this step, individual fine particles 13 are not uniformly dispersed but are intentionally distributed so that sparse portions and dense portions are formed by the convection during drying. A portion where the fine particles 13 are densely gathered forms one peak, and thus a surface profile having a smooth waviness is formed. Furthermore, the drying temperature and the drying time can be appropriately determined on the basis of the boiling point of the solvent contained in the coating material. In such a case, the drying temperature and the drying time are preferably set in the ranges where deformation of the base member 11 due to thermal shrinkage does not occur in consideration of heat resistance of the base member 11.

The drying step and curing step will be specifically described below.

First, the coating material applied on the base member 11 is dried at a predetermined temperature to generate convection in the coating material and to distribute the fine particles 13 densely in some portions and sparsely in other portions by the convection.

The degree of distribution of the fine particles 13, the distribution including sparse portions and dense portions, can be selected, for example, by appropriately adjusting the surface tension of the solvent and the surface energy of the fine particles 13. In addition, the drying temperature and the drying time can be appropriately determined on the basis of the boiling point of the solvent contained in the coating material. In such a case, the drying temperature and the drying time are preferably set in the ranges where deformation of the base member 11 due to thermal shrinkage does not occur in consideration of heat resistance of the base member 11.

The drying conditions are not particularly limited. The drying may be natural drying or artificial drying in which the drying temperature and the drying time are adjusted. However, in the case where the surface of the coating is exposed to wind during drying, it is preferable that wind ripples do not form on the surface of the coating film. The reason for this is as follows. If wind ripples are formed, the desired gently wavy irregular shape does not tend to be formed on the surface of the antiglare layer, and this it becomes difficult to achieve both the antiglare property and the contrast.

Next, the resin dried on the base member 11 is cured by, for example, irradiation of ionizing radiation or heating. As a result, gentle irregularities are formed on the surface of the coating material because of the difference in cure shrinkage ratio between the portions where the fine particles 13 are densely distributed and the portions where the fine particles 13 are sparsely distributed. That is, a portion where the fine particles 13 are densely distributed forms one peak, and thus waviness having a large period is formed. That is, an irregular shape that has a longer period and is gentle as compared with the related art is formed on the surface of the antiglare layer 12.

For example, electron beams, ultraviolet rays, visible rays, gamma rays, electron beams, or the like can be used as the ionizing radiation. Ultraviolet rays are preferable from the standpoint of production equipment. Examples of the ultraviolet ray source that can be used include an ultra-high-pressure mercury lamp, a high-pressure mercury lamp, a low-pressure mercury lamp, a carbon arc, a xenon arc, and a metal halide lamp. Preferably, the integrated exposure dose is adequately selected in consideration of the curing properties of the resin, suppression of yellowing of the resin and the base member 11, and the like. Examples of the atmosphere of irradiation include air and an inert gas atmosphere such as nitrogen or argon.

As a result, a target antiglare film is obtained.

As described above, according to this first embodiment, the coating material containing the fine particles 13 and the resin is applied onto the base member 11 and the coating material is dried, whereby convection is generated in the coating material, the fine particles 13 are distributed densely in some portions and sparsely in other portions by the convection, and the coating material in which the fine particles 13 are distributed densely in some portions and sparsely in other portions is cured. The resin contains 3% by weight or more and 20% by weight or less polymer relative to the total amount of the resin, the average particle diameter of the fine particles 13 is 2.4 μm or more and 8 μm or less, and the average film thickness of the antiglare layer 12 is 8 μm or more and 18 μm or less. Thus, an antiglare film that has a high contrast and good antiglare property can be realized.

(2) Second Embodiment (2-1) Structure of Antiglare Film

Figure 6:
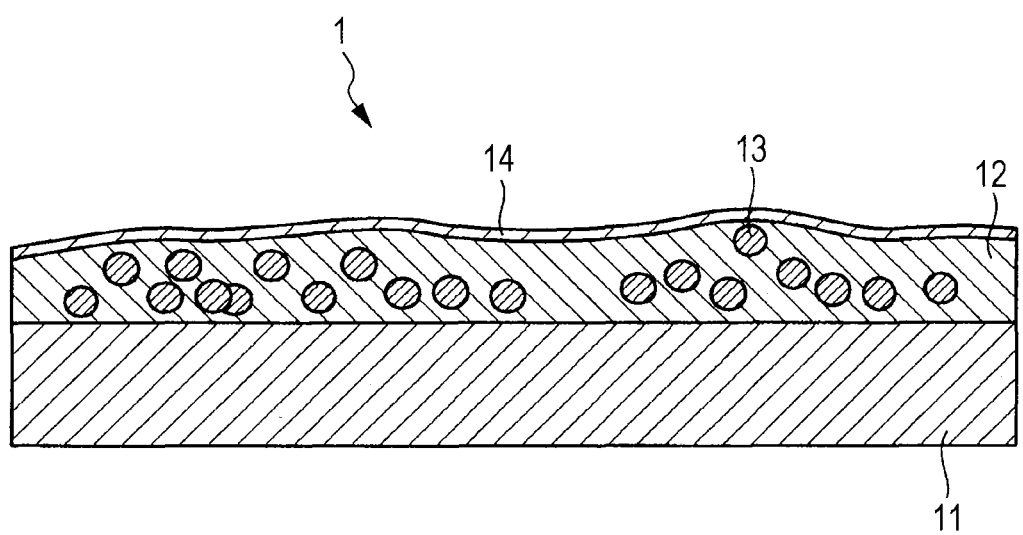
FIG. 6 is an enlarged cross-sectional view showing one example of the structure of an antiglare film according to a second embodiment.

FIG. 6 shows one example of the structure of an antiglare film according to a second embodiment. As shown in FIG. 6, an antiglare film 1 of the second embodiment differs from the first embodiment in that a low-refractive-index layer 14 is further provided on an antiglare layer 12. Since a base member 11 and the antiglare layer 12 are the same as those in the first embodiment, they are assigned the same reference characters and a description thereof is omitted.

As shown in FIG. 6, the low-refractive-index layer 14 is preferably provided so as to follow the waviness on the surface of the antiglare layer. More preferably, the low-refractive-index layer 14 has a substantially uniform thickness, and the waviness of the surface of an antireflection layer has gentle waviness substantially the same as that of the surface of the antiglare layer. According to this structure, even when the low-refractive-index layer 14 is provided, both contrast and antiglare property can be achieved. Note that, although it is ideal that the low-refractive-index layer 14 have a substantially uniform thickness as described above, the low-refractive-index layer 14 need not be provided over the entire region of the antiglare layer 12. A sufficient contrast can be achieved as long as the low-refractive-index layer is substantially uniformly provided over the most portions of the antiglare layer 12 excluding the protruding portions, that is, over relatively flat and smooth portions having a high reflectivity.

Figure 7:
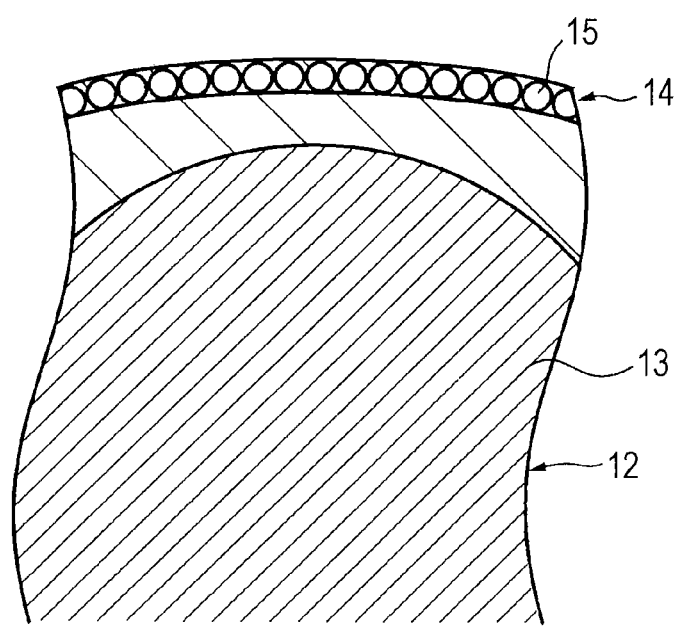
FIG. 7 is an enlarged cross-sectional view of a low-refractive-index layer 14 shown in FIG. 6.

FIG. 7 is an enlarged cross-sectional view of the low-refractive-index layer 14 shown in FIG. 6. As shown in FIG. 7, the low-refractive-index layer 14 includes, for example, a resin and hollow fine particles 15. The hollow fine particles 15 are preferably dispersed over the entire surface of the antiglare layer 12. In addition, preferably, the hollow fine particles 15 are embedded in the low-refractive-index layer 14, and the embedded hollow fine particles 15 form a layer of the hollow fine particles 15 in which about two to three particles are overlapped in the thickness direction of the low-refractive-index layer 14.

(2-2) Method for Manufacturing Antiglare Film

Next, one example of a method for manufacturing the antiglare film of the second embodiment will be described. This method for manufacturing the antiglare film of the second embodiment differs from the first embodiment in that the method further includes a step of forming the low-refractive-index layer, the step being conducted after the step of forming the antiglare layer. Accordingly, only the step of forming the low-refractive-index layer will be described below.

(Preparation of Coating Material)

First, for example, hollow fine particles 15, a resin, and a solvent are mixed in a stirrer, such as a disper, or a dispersion machine, such as a bead mill, to prepare a coating material. In addition, additives such as a photostabilizer, an ultraviolet absorber, an antistatic agent, a flame retardant, an antioxidant, and the like may be added, if necessary.

As the resin, an ionizing radiation-curable resin that can be cured by irradiation of light or an electron beam and a thermosetting resin that can be cured by heat can be used alone or in combinations. From the standpoint of ease of manufacturing, a photosensitive resin that can be cured by ultraviolet rays is most preferable. The ionizing radiation-curable resin preferably contains 90% or more of a polyfunctional monomer. Examples of the polyfunctional monomer include esters of a polyhydric alcohol and (meth)acrylic acid. Specifically, examples thereof include ethylene glycol di(meth)acrylate, 1,4-dicyclohexane diacrylate, pentaerythritol tetra(meth)acrylate, pentaerythritol tri(meth)acrylate, trimethylolpropane tri(meth)acrylate, trimethylolethane tri(meth)acrylate, dipentaerythritol tetra(meth)acrylate, dipentaerythritol penta(meth)acrylate, dipentaerythritol hexa(meth)acrylate, 1,2,3-cyclohexane tetramethacrylate, polyurethane polyacrylate, and polyester polyacrylate.

Examples of the hollow fine particles 15 include inorganic fine particles such as silica and alumina, and organic fine particles such as styrene and acryl. Silica fine particles are particularly preferable. Since the hollow fine particles 15 contain air inside, the refractive index thereof is lower than that of normal fine particles. For example, whereas the refractive index of silica fine particles is 1.46, the refractive index of hollow silica fine particles is 1.45 or less.

The average particle diameter of the hollow fine particles 15 is preferably 10 to 200 nm and more preferably 30 to 60 nm. If the average particle diameter exceeds 200 nm, the size is not negligible compared with the visible light wavelength, and thus light is scattered on the surface of the low-refractive-index layer 14. As a result, the transparency is degraded and a display surface and the like appears whitish. If the average particle diameter is less than 10 nm, the hollow fine particles 15 tend to aggregate. Furthermore, from the standpoint of improving the compatibility with the resin, the hollow fine particles 15 such as hollow silica fine particles preferably have (meth)acryloyl groups polymerizable with an ionizing radiation on the surfaces thereof.

For example, modified silicon acrylate compounds or the like may be used as the additive, for example. Specific examples thereof include compounds having at least one organic group in a dimethyl silicon molecule. The equivalent of the organic group bonded to dimethyl silicon is preferably 1,630 g/mol or more. As for a method of measuring the equivalent of the organic group, the equivalent of the organic group can be calculated using a nuclear magnetic resonance (NMR) measuring method from the peak intensity ratio of $^1H$ of the methyl groups and $^1H$ of the organic group in the dimethyl silicon molecule. Examples of the organic group include a methacryl group, an acryl group, and a mercapto group.

A solvent that dissolves the resin used but that does not dissolve the underlying antiglare layer 12 is preferred as the solvent. Examples of such a solvent include organic solvents such as tertiary butanol, toluene, methyl ethyl ketone (MEK), isopropyl alcohol (IPA), and methyl isobutyl ketone (MIBK).

(Application)

Next, the coating material prepared as described above is applied onto the antiglare layer 12. Examples of the method of applying the coating material include a gravure coater, a bar coater, a die coater, a knife coater, a comma coater, a spray coater, and a curtain coater. The application method is not limited to those described above and any method can be employed as long as a predetermined amount of coating material can be applied so as to have a uniform thickness.

(Drying and Curing)

Next, the coating material applied on the antiglare layer 12 is dried and cured. Consequently, a low-refractive-index layer 14 with a gentle irregular shape is formed on the antiglare layer 12. The drying and curing methods the same as those used in the process of preparing the antiglare layer of the above-described first embodiment can be employed.

As a result, a target antiglare film 1 is obtained.

According to this second embodiment, since the low-refractive-index layer 14 is further provided on the antiglare layer 12, the reflectivity can be further decreased compared with the first embodiment described above.

(3) Third Embodiment

Figure 8:
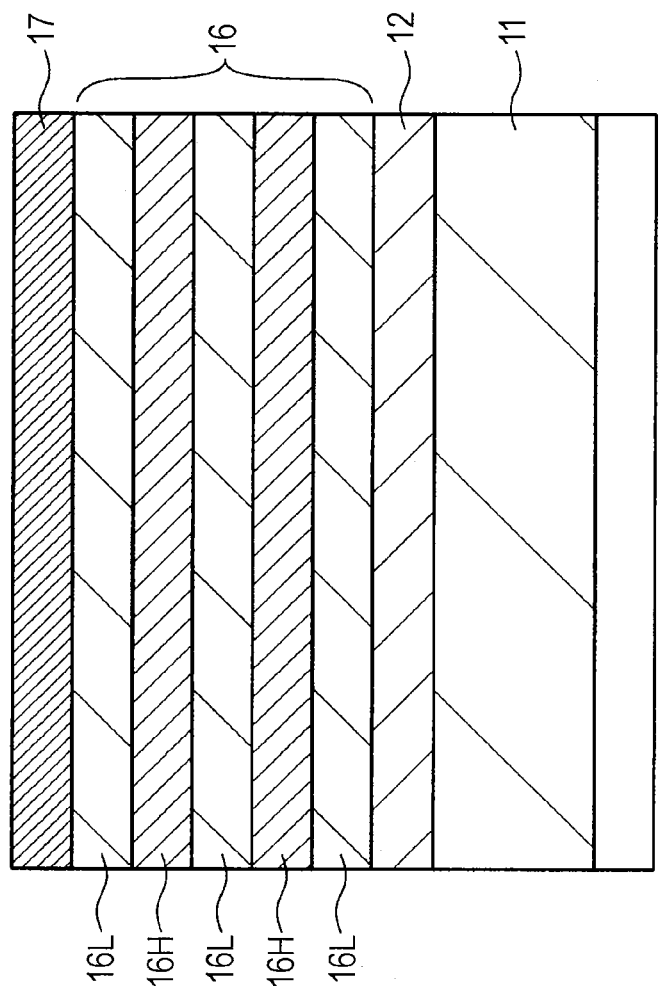
FIG. 8 is a schematic cross-sectional view showing one example of the structure of an antiglare film according to a third embodiment.

FIG. 8 shows one example of the structure of an antiglare film according to a third embodiment. As shown in FIG. 8, an antiglare film 1 differs from the above-described first embodiment in that a multilayered antireflection layer is provided on an antiglare layer 12. Since a base member 11 and the antiglare layer 12 are the same as those in the above-described first embodiment, they are assigned the same reference characters and a description thereof is omitted.

A multilayered antireflection layer 16 is a stacked film including both low-refractive-index layers 16L and high-refractive-index layers 16H. The numbers of stacks of the low-refractive-index layers 16L and the high-refractive-index layers 16H are preferably adequately selected in accordance with desired characteristics. Examples of the material for the low-refractive-index layers 16L that can be used include, but are not particularly limited to, $SiO_x$, $SiO_2$, $Al_2O_3$, and mixtures thereof. The material can be adequately selected from known low-refractive-index materials in accordance with characteristics required for the low-refractive-index layers 16L and used. Examples of the material for the high-refractive-index layers 16H that can be used include, but are not particularly limited to, $TiO_2$, $Nb_2O_3$, $Ta_2O_5$, $WO_3$, and mixtures thereof. The material can be adequately selected from known high-refractive-index materials in accordance with characteristics required for the high-refractive-index layers 16H and used. A sputtering method is preferably used as a method for depositing the low-refractive-index layers 16L and the high-refractive-index layers 16H, but the method is not limited to this.

In addition, as shown in FIG. 8, from the standpoint of, for example, suppressing the adhesion of contamination on the surface of the antiglare film 1, an antifouling layer 17 may be further provided on the multilayered antireflection layer 16, as required. A fluorine-based compound is preferably used as the antifouling layer 17, but the antifouling layer 17 is not limited thereto.

According to this third embodiment, since the multilayered antireflection layer 16 is further provided on the antiglare layer 12, the reflectivity can be further decreased compared with the first embodiment described above.

(4) Fourth Embodiment

In a fourth embodiment, an optical film used as an antiglare film in the first embodiment is used as an "anti-Newton-ring (ANR) film" (hereinafter referred to as "ANR film").

Figure 9:
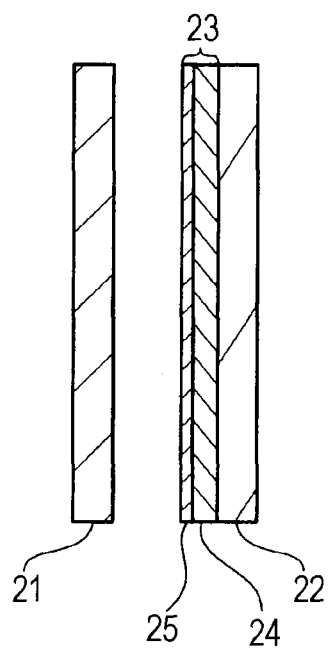
FIG. 9 is a schematic cross-sectional view showing an example of the structure of a display apparatus according to a fourth embodiment.
Figure 10:
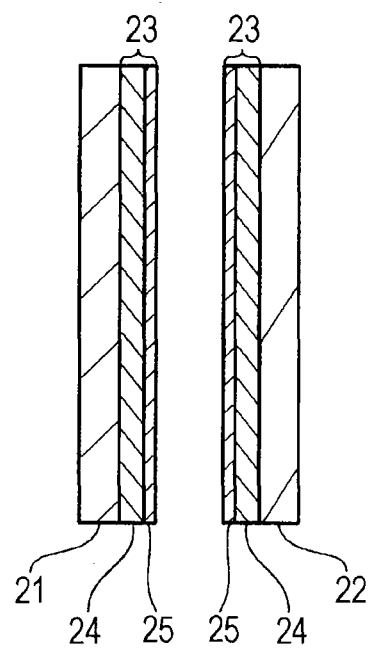
FIG. 10 is a schematic cross-sectional view showing an example of the structure of a display apparatus according to the fourth embodiment.

FIGS. 9 and 10 show examples of the structures of display apparatuses according to the fourth embodiment. Each of the display apparatuses includes a display unit 21 and a front surface member 22 provided on the front surface side of the display unit 21. For example, an air layer is formed between the display unit 21 and the front surface member 22. An ANR film 23 is provided on at least one of the front surface side of the display unit 21 and the rear surface side of the front surface member 22. Specifically, FIG. 9 shows an example of a display apparatus including an ANR film 23 on the rear surface side of the front surface member 22. On the other hand, FIG. 10 shows an example of a display apparatus including ANR films 23 both on the front surface side of the display unit 21 and on the rear surface side of the front surface member 22. From the standpoint of suppressing occurrence of Newton rings, ANR films 23 are provided on both the display surface side of the display unit 21 and on the rear surface side of the front surface member 22. The ANR film 23 is bonded to the front surface member 22 or the display unit 21 with an adhesive agent or the like. Note that, in the present invention, the "front surface" is the surface serving as a display surface, i.e., the surface located at the viewer's side, and the "rear surface" is the surface opposite the display surface.

Examples of the display unit 21 that can be used include liquid crystal displays, cathode ray tube (CRT) displays, plasma display panels (PDPs), organic electroluminescence (EL) displays, inorganic EL displays, surface-conduction electron-emitter displays (SEDs), and field emission displays (FEDs).

The front surface member 22 is used for the purpose of providing mechanical, thermal, and weathering protections and a design function to the front surface (viewer's side) of the display unit 21. The front surface member 22 is, for example, sheet-shape, film-shape, or plate-shaped. Examples of the usable material for the front surface member 22 that can be used include, glass, triacetyl cellulose (TAC), polyesters (TPEE), polyethylene terephthalate (PET), polyimides (PI), polyamides (PA), aramids, polyethylene (PE), polyacrylates, polyethersulfone, polysulfone, polypropylene (PP), diacetyl cellulose, polyvinyl chloride, acrylic resins (PMMA), and polycarbonate (PC). However, the material is not particularly limited to these materials and any material having transparency can be used.

Figure 11:
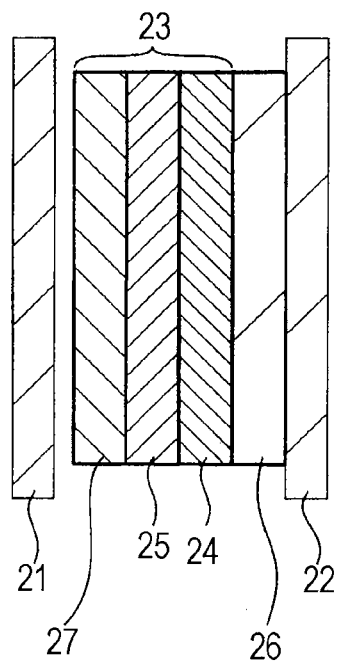
FIG. 11 is a schematic cross-sectional view showing one example of the structure of an ANR film according to the fourth embodiment.

FIG. 11 shows one example of the structure of an ANR film. An ANR film 23 suppresses occurrence of Newton rings in the display apparatus. As shown in FIG. 11, the ANR film 23 includes a base member 24 and an ANR layer 25 provided on the base member 24. The ANR film 23 is bonded onto an adherend such as a front surface member 22 with an adhesive layer 26 therebetween. The adhesive layer 26 contains an adhesive agent as a main component. For example, known adhesive agents used in the technical field of optical films can be used as the adhesive agent. It should be noted that, in this specification, tackiness agents such as pressure-sensitive adhesives (PSAs) are also considered as one type of adhesive agents.

A film identical to the antiglare film 1 in the first embodiment can be used as the ANR film 23. Specifically, the base member 24 and the ANR layer 25 identical to the base member 11 and the antiglare layer 12, respectively, in the first embodiment can be used.

It should be noted that, unlike the first embodiment, since the ANR film 23 serving as an optical film is not used on the top surface of the display apparatus in this fourth embodiment, it is possible to extend the allowance of the surface hardness. Accordingly, the average film thickness of the ANR layer 12 is 6.4 µm or more and 18 µm or less, preferably 8 µm or more and 18 µm or less, more preferably 9 µm or more and 16 µm or less, and most preferably 11 µm or more and 13 µm or less. At an average film thickness of less than 6.4 µm, the hardness is reduced and it is difficult to provide the layer in the display apparatus as an ANR layer 12, dry aggregation significantly occurs, and thus the surface becomes an orange peel-like surface, thereby causing glare. At an average film thickness exceeding 18 µm, curling significantly occurs in a step of curing the resin during manufacturing.

In addition, as shown in FIG. 11, preferably, an anti-reflection (AR) layer 27 is further provided on the ANR layer 25 from the standpoint of reducing reflected light. The AR layer 27 may be either a dry-type layer or a wet-type layer, but preferably a wet-type layer. Examples of the wet-type AR layer 27 include a layer containing a fluorine-based resin and a layer containing hollow fine particles such as silica.

According to the fourth embodiment, by arranging the ANR film 23 on at least one of the front surface side of the display unit 21 and the rear surface side of the front surface member 22, the occurrence of Newton rings can be suppressed or the occurrence of Newton rings can be reduced to a negligible level.

(5) Fifth Embodiment

Figure 12:
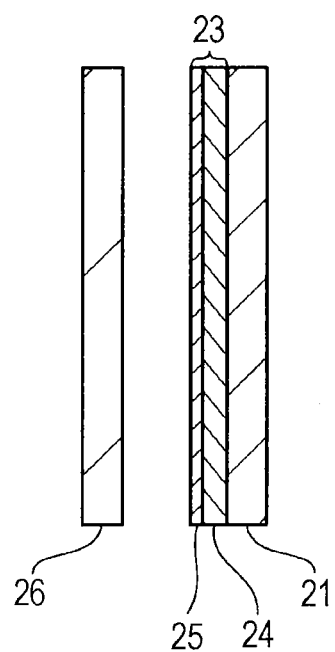
FIG. 12 is a schematic cross-sectional view showing an example of the structure of a display apparatus according to a fifth embodiment.
Figure 13:
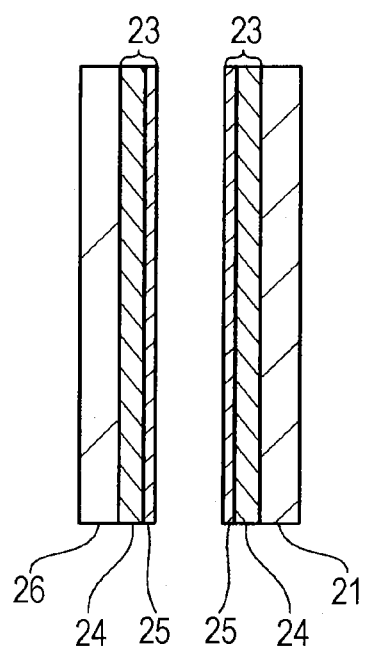
FIG. 13 is a schematic cross-sectional view showing an example of the structure of a display apparatus according to the fifth embodiment.

FIGS. 12 and 13 show examples of the structures of display apparatuses according to a fifth embodiment. The fifth embodiment differs from the fourth embodiment in that the display apparatus includes a display unit 21, a rear surface member 26 provided on the rear surface side of the display unit 21, and an ANR film 23 provided on at least one of the rear surface side of the display unit 21 and the front surface side of the rear surface member 26.

Specifically, FIG. 12 shows an example of a display apparatus including an ANR film 23 on the rear surface side of the display unit 21. On the other hand, FIG. 13 shows an example of a display apparatus including an ANR film 23 on the rear surface side of the display unit 21 and on the front surface side of the rear surface member 26, respectively. Note that the same components as the fourth embodiment are assigned the same reference characters and a description thereof is omitted.

The rear surface member 26 is, for example, sheet-shaped, film-shaped, or plate-shaped. When the display unit is a liquid crystal display, the rear surface member 26 is, for example, a diffusing plate or diffusing sheet that makes the illuminance of light emitted from the light source uniform in a plane, a lens film for controlling the viewing angle, a polarization separation reflection film that polarizes and separates light from the light source for reuse, or the like.

According to the fifth embodiment, by arranging the ANR film 23 on at least one of the rear surface side of the display unit 21 and the front surface side of the rear surface member 26, the occurrence of Newton rings can be suppressed or the occurrence of Newton rings can be reduced to a negligible level.

(6) Sixth Embodiment

Figure 14:
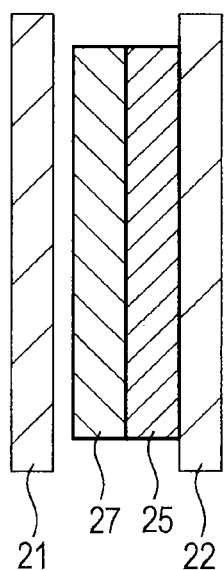
FIG. 14 is a schematic cross-sectional view showing one example the structure of a display apparatus according to a sixth embodiment.

FIG. 14 shows one example of the structure of a display apparatus according to a sixth embodiment. The sixth embodiment differs from the fourth embodiment in that an ANR layer 25 is formed directly on at least one of the front surface side of the display unit 21 and the rear surface side of the front surface member 22 without using an adhesive agent or the like. FIG. 14 shows an example in which the ANR layer 25 is formed directly on the rear surface of the front surface member 22. The same components as the fourth embodiment are assigned the same reference characters and a description thereof is omitted.

Note that, also in the fifth embodiment, the ANR layer 25 may be formed directly on at least one of the rear surface side of the display unit 21 and the front surface side of the rear surface member 26.

According to the sixth embodiment, since the ANR layer 25 is formed directly on at least one of the front surface side of the display unit 21 and the rear surface side of the front surface member 22, the structure and the production process of the display apparatus can be simplified compared with the fourth embodiment.

EXAMPLES

The embodiments will now be specifically described using Examples, but the embodiments are not limited to only these Examples.

In Examples, the average particle diameter of fine particles and the dry film thickness of the antiglare layer were measured as follows.

(Average Particle Diameter of Fine Particles)

The average particle diameter of fine particles was determined by measuring the particle diameter with a Coulter Multisizer and averaging the obtained data.

(Dry Film Thickness of Antiglare Layer)

The dry film thickness (average film thickness) of the antiglare layer was determined with a contact thickness meter (produced by TESA K.K.) as follows. A cylindrical probe having a diameter of 6 mm was used as a contact probe. First, the cylindrical probe was brought into contact with the antiglare layer at such a low load that the antiglare layer is not broken. Next, measurement was performed at arbitrary five points to determine the average value $D_A$ of the total thickness of the antiglare film. Furthermore, the thickness of an uncoated portion of the same base member was measured to determine the thickness $D_B$ of the base member. The value calculated by subtracting the thickness $D_B$ of the base member from the average value $D_A$ was defined as the thickness of the antiglare layer. In the case where such an uncoated portion cannot be obtained, the thickness of the base member can be measured by preparing a cross section of the antiglare film by a microtome technique or the like. However, since the thickness thus measured is a microscopic film thickness, it is preferable to determine the film thickness as the average film thickness as described in the former method.

Example 1

The materials shown in the coating material composition below were blended, and the resulting mixture was stirred with a magnetic stirrer for one hour to obtain a coating material. Next, the obtained coating material was applied onto a TAC film (produced by Fujifilm Corporation) having a thickness of 80 μm with a bar coater. The resulting film was dried in a drying furnace at 80° C. for two minutes and then irradiated with ultraviolet rays at 1 J/cm² to form an antiglare layer having a dry film thickness of 13.2 μm. Thus, a target optical film was obtained.

<Coating Material Composition>

Hexafunctional urethane acrylic oligomer 90 parts by weight

Acrylic polymer 10 parts by weight

Initiator Irgacure 184 5 parts by weight

Solvent Butyl acetate 65 parts by weight

Dimethyl carbonate 53 parts by weight

Silicon-based leveling agent 0.05 parts by weight

Cross-linking acryl-styrene copolymer fine particles (Techpolymer produced by Sekisui Plastics Co., Ltd., refractive index 1.515, average particle diameter 5.5 μm, coefficient of variation 8) 10 parts by weight

Example 2

An optical film including an antiglare layer having an average film thickness of 16.3 μm was obtained as in Example 1 except that the fine particles below were blended in the amount added below.

Cross-linking acryl-styrene copolymer fine particles (Techpolymer produced by Sekisui Plastics Co., Ltd., refractive index 1.510, average particle diameter 5.5 μm, coefficient of variation 8) 10 parts by weight

Example 3

An optical film including an antiglare layer having an average film thickness of 9.4 μm was obtained as in Example 1 using the same materials by the same process except that, specifically, the fine particles below were blended in the amount added below.

Cross-linking acryl-styrene copolymer fine particles (Techpolymer produced by Sekisui Plastics Co., Ltd., refractive index 1.525, average particle diameter 5.5 μm, coefficient of variation 8) 10 parts by weight

Example 4

An optical film including an antiglare layer having an average film thickness of 8.8 μm was obtained as in Example 1 except that the fine particles below were blended in the amount added below.

Cross-linking acryl-styrene copolymer fine particles (Techpolymer produced by Sekisui Plastics Co., Ltd., refractive index 1.500, average particle diameter 5.5 μm, coefficient of variation 8) 10 parts by weight

Example 5

An optical film including an antiglare layer having an average film thickness of 8.1 μm was obtained as in Example 1 except that the fine particles below were blended in the amount added below.

Cross-linking acryl-styrene copolymer fine particles (Techpolymer produced by Sekisui Plastics Co., Ltd., refractive index 1.545, average particle diameter 2.5 μm, coefficient of variation 8) 15 parts by weight

Example 6

An optical film including an antiglare layer having an average film thickness of 17.3 μm was obtained as in Example 1 except that the fine particles below were blended in the amount added below.

Cross-linking acryl-styrene copolymer fine particles (Techpolymer produced by Sekisui Plastics Co., Ltd., refractive index 1.515, average particle diameter 8 μm, coefficient of variation 8) 15 parts by weight

Example 7

An optical film including an antiglare layer having an average film thickness of 11 μm was obtained as in Example 1 except that the resins and the fine particles below were blended in the amounts added below.

Hexafunctional urethane acrylic oligomer 97 parts by weight

Acrylic polymer 3 parts by weight

Cross-linking acryl-styrene copolymer fine particles (Techpolymer produced by Sekisui Plastics Co., Ltd., refractive index 1.510, average particle diameter 4.5 μm, coefficient of variation 8) 15 parts by weight

Example 8

An optical film including an antiglare layer having an average film thickness of 11 μm was obtained as in Example 1 except that the resins and the fine particles below were blended in the amounts added below.

Hexafunctional urethane acrylic oligomer 95 parts by weight

Acrylic polymer 5 parts by weight

Cross-linking acryl-styrene copolymer fine particles (Techpolymer produced by Sekisui Plastics Co., Ltd., refractive index 1.510, average particle diameter 4.5 μm, coefficient of variation 8) 15 parts by weight Example 9

An optical film including an antiglare layer having an average film thickness of 11 μm was obtained as in Example 1 except that the fine particles below were blended in the amount added below.

Hexafunctional urethane acrylic oligomer 85 parts by weight

Acrylic polymer 15 parts by weight

Cross-linking acryl-styrene copolymer fine particles (Techpolymer produced by Sekisui Plastics Co., Ltd., refractive index 1.510, average particle diameter 4.5 μm, coefficient of variation 8) 15 parts by weight Example 10

An optical film including an antiglare layer having an average film thickness of 11 μm was obtained as in Example 1 except that the resins and the fine particles below were blended in the amounts added below.

Hexafunctional urethane acrylic oligomer 80 parts by weight

Acrylic polymer 20 parts by weight

Cross-linking acryl-styrene copolymer fine particles (Techpolymer produced by Sekisui Plastics Co., Ltd., refractive index 1.510, average particle diameter 4.5 μm, coefficient of variation 8) 15 parts by weight Example 11

First, an antiglare film including an antiglare layer having an average film thickness of 13.2 μm was obtained as in Example 1. Next, a low-refractive-index coating material containing hollow silica was applied onto the obtained antiglare film with a bar coater so as to have a thickness of 120 nm, and then cured. Accordingly, a low-refractive-index layer (antireflection coating) was formed on the antiglare layer. As a result, a target antiglare film was obtained.

Example 12

First, an antiglare film including an antiglare layer having an average film thickness of 13.2 μm was obtained as in Example 1. Next, a $SiO_x$ film having a film thickness of 5 nm, a $Nb_2O_5$ film having a film thickness of 10 nm, a $SiO_2$ film having a film thickness of 30 nm, a $Nb_2O_5$ film having a thickness of 100 nm, and a $SiO_2$ film having a film thickness of 90 nm were stacked on the antiglare layer in that order by a sputtering method. Accordingly, a multilayered antireflection layer was formed on the antiglare layer. As a result, a target antiglare film was obtained.

Example 13

The materials shown in the coating material composition below were blended, and the resulting mixture was stirred with a magnetic stirrer for one hour to obtain a coating material. Next, the obtained coating material was applied onto a TAC film (produced by Fujifilm Corporation) having a thickness of 80 μm with a bar coater. The resulting film was dried in a drying furnace at 80° C. for two minutes and then irradiated with ultraviolet rays at 500 mJ/cm² to form an antiglare layer having a dry film thickness of 8 μm. Thus, an optical film of Example 13 was obtained.

<Coating Material Composition>

Hexafunctional urethane acrylic oligomer 90 parts by weight Acrylic polymer 10 parts by weight Initiator Irgacure 184 5 parts by weight Solvent Butyl acetate 65 parts by weight Dimethyl carbonate 53 parts by weight Silicon-based leveling agent 0.05 parts by weight Cross-linking acrylic beads (produced by Soken Chemical & Engineering Co., Ltd., refractive index 1.525, average particle diameter 5.0 μm, coefficient of variation 7) 9 parts by weight Example 14

An optical film including an antiglare layer having an average film thickness of 8 μm was obtained as in Example 1 except that the fine particles below were blended in the amount added below.

Cross-linking acryl-styrene copolymer fine particles (Techpolymer produced by Sekisui Plastics Co., Ltd., refractive index 1.525, average particle diameter 5.0 μm, coefficient of variation 8) 9 parts by weight Example 15

First, an antiglare film including an antiglare layer having an average film thickness of 8 μm was obtained as in Example 14. Next, a low-refractive-index coating material containing hollow silica was applied onto the obtained antiglare film with a bar coater so as to have a thickness of 120 nm, and then cured. Accordingly, a low-refractive-index layer (antireflection coating) was formed on the antiglare layer. As a result, a target antiglare film was obtained.

Example 16

An optical film including an antiglare layer having an average film thickness of 6.4 μm was obtained as in Example 1 except that the resins and the fine particles below were blended in the amounts added below.

Hexafunctional urethane acrylic oligomer 95 parts by weight

Acrylic polymer 5 parts by weight

Cross-linking acryl-styrene copolymer fine particles (Techpolymer produced by Sekisui Plastics Co., Ltd., refractive index 1.525, average particle diameter 4.0 μm, coefficient of variation 8) 9 parts by weight Example 17

An optical film including an antiglare layer having an average film thickness of 8 μm was obtained as in Example 13 except that the fine particles having the refractive index below were used as the fine particles.

Cross-linking acrylic beads (produced by Soken Chemical & Engineering Co., Ltd., refractive index 1.560, average particle diameter 5.0 μm, coefficient of variation 7) 9 parts by weight Comparative Example 1

An optical film including an antiglare layer having an average film thickness of 7.3 μm was obtained as in Example 1 except that the dry film thickness was controlled to be 7.3 μm.

Comparative Example 2

An optical film including an antiglare layer having an average film thickness of 8 μm was obtained as in Example 1 except that the fine particles below were blended in the amount added below.

Cross-linking acryl-styrene copolymer fine particles (Techpolymer produced by Sekisui Plastics Co., Ltd., refractive index 1.515, average particle diameter 1.8 μm, coefficient of variation 8) 15 parts by weight

Comparative Example 3

An optical film including an antiglare layer having an average film thickness of 11 μm was obtained as in Example 1 except that the resin and the fine particles below were blended in the amounts added below.

Hexafunctional urethane acrylic oligomer 100 parts by weight

Cross-linking acryl-styrene copolymer fine particles (Techpolymer produced by Sekisui Plastics Co., Ltd., refractive index 1.510, average particle diameter 4.5 μm, coefficient of variation 8) 15 parts by weight

Comparative Example 4

An optical film including an antiglare layer having an average film thickness of 11 μm was obtained as in Example 1 except that the resins and the fine particles below were blended in the amounts added below.

Hexafunctional urethane acrylic oligomer 75 parts by weight

Acrylic polymer 25 parts by weight

Cross-linking acryl-styrene copolymer fine particles (Techpolymer produced by Sekisui Plastics Co., Ltd., refractive index 1.510, average particle diameter 4.5 μm, coefficient of variation 8) 15 parts by weight

Comparative Example 5

An optical film including an antiglare layer having an average film thickness of 18 μm was obtained as in Example 1 except that the resins and the fine particles below were blended in the amounts added below.

Hexafunctional urethane acrylic oligomer 95 parts by weight

Acrylic polymer 5 parts by weight

Acrylic fine particles (Techpolymer produced by Sekisui Plastics Co., Ltd., refractive index 1.495, average particle diameter 8 μm, coefficient of variation 8) 10 parts by weight

Comparative Example 6

An optical film including an antiglare layer having an average film thickness of 8 μm was obtained as in Example 1 except that the resins and the fine particles below were blended in the amounts added below.

Hexafunctional urethane acrylic oligomer 90 parts by weight

Acrylic polymer 10 parts by weight

Cross-linking acryl-styrene copolymer fine particles (Techpolymer produced by Sekisui Plastics Co., Ltd., refractive index 1.560, average particle diameter 6 μm, coefficient of variation 30) 6 parts by weight

Comparative Example 7

An optical film including an antiglare layer having an average film thickness of 10 μm was obtained as in Example 13 except that the fine particles below were blended.

Cross-linking acrylic fine particles (Techpolymer produced by Sekisui Plastics Co., Ltd., refractive index 1.49, average particle diameter 5.0 μm, coefficient of variation 8) 10 parts by weight

Comparative Example 8

An optical film including an antiglare layer having an average film thickness of 11 μm was obtained as in Example 13 except that the resins and the fine particles below were blended.

Hexafunctional urethane acrylic oligomer 88 parts by weight

Acrylic polymer 22 parts by weight Cross-linking acrylic fine particles (Techpolymer produced by Sekisui Plastics Co., Ltd., refractive index 1.57, average particle diameter 5.0 μm, coefficient of variation 8) 10 parts by weight

Comparative Example 9

An optical film including an antiglare layer having an average film thickness of 5 μm was obtained as in Example 16 except that the fine particles below were blended in the amount added below.

Cross-linking acryl-styrene copolymer fine particles (Techpolymer produced by Sekisui Plastics Co., Ltd., refractive index 1.525, average particle diameter 4.0 μm, coefficient of variation 8) 9 parts by weight

Comparative Example 10

An antiglare film was obtained as in Example 1 except that the average film thickness of the antiglare layer was controlled to be 19 μm.

The roughness, opacity, antiglare property, Martens hardness, and state of fine particles of antiglare films of Examples and Comparative Examples were evaluated as follows.

(Roughness Evaluation)

The surface roughness of the antiglare films of Examples and Comparative Examples was measured. A roughness profile was obtained from a two-dimensional primary profile, and the arithmetic mean roughness Ra, the root-mean-square slope RΔq of the roughness profile, and the mean width RSm of the profile elements were calculated as roughness parameters. The results are shown in Tables 1 to 5. The measurement conditions complied with JIS B0601: 2001. The measuring device and measurement conditions were as follows.

Measuring device: Fully automatic microfigure measuring instrument,

Surfcorder ET4000A (produced by Kosaka Laboratory, Ltd.)

λc=0.8 mm, evaluation length 4 mm, cutoff×5 times data sampling interval 0.5 μm (Opacity)

The opacity of the antiglare films of Examples and Comparative Examples was measured. The results are shown in Tables 1 to 5. The feel of opaque is felt when reflected light scattered at the surface of the antiglare layer is sensed. Here, a commercially available spectrophotometer was used, the phenomenon described above was generated by a simulation, and the quantified values were defined as the opacity. Note that, it was confirmed by experiments that the opacity measured here is correlated with the feeling of opacity that is visually observed.

The specific method for measuring the opacity will be described below. First, in order to suppress the influence of rear surface reflection and evaluate diffuse reflection of the antiglare film itself, a black acrylic plate (Acrylite L 502 produced by Mitsubishi Rayon Co., Ltd.) was bonded to the rear surface of each antiglare film with a tackiness agent therebetween. Next, measurement was performed with an integrating sphere spectrophotometer SP64 produced by X-Rite Inc. using a D65 light source in a d/8° optical system in which diffused light is applied to a sample surface and the reflected light is measured with a detector located at a position slanted at an angle of 8° with respect to the sample normal direction. The SPEX mode in which specular reflection components are removed and only the diffuse reflection components are detected was used for the measured values, and the measurement was carried out at a detection viewing angle of 2°. In this manner, the ratio of the diffuse reflection intensity to the light source intensity can be determined.

(Evaluation 1 of Antiglare Property)

The antiglare property of the antiglare films of Examples and Comparative Examples was evaluated as follows. First, an antiglare film was bonded to a black acrylic plate (A4 size) with a tacky layer therebetween to prepare an evaluation sample. Next, the antiglare film (plate) was vertically disposed at the height of the eyes of a viewer in a room with an illuminance of 200 lux so that the face of the viewer was reflected to the antiglare film. In this case, the distance between the antiglare film and the face of the viewer was 50 cm. The degree of reflection of this reflected image was evaluated by the following standard. The results are shown in Tables 1 to 5.

A: The eyes of the reflected image were not recognizable.
B: The eyes were recognizable to some extent, but their contours were blurred.
C: The eyes were directly reflected.

(Evaluation 2 of Antiglare Property)

The antiglare property of the antiglare films of Examples and Comparative Examples was evaluated as follows.

Each of the antiglare films was bonded to a black acrylic plate with a tackiness agent therebetween. A fluorescent lamp (300 lux), which was 2 m distant from the plate, was vertically reflected, and the degree of reflection of an edge of the fluorescent tube was compared. The degree of reflection was evaluated by the following standard. The results are shown in Tables 1 to 5.

a: The edge of the fluorescent tube was not recognizable.
b: The edge of the fluorescent tube was not readily recognizable.
c: The fluorescent tube was directly reflected.

(Martens Hardness)

For the antiglare films of Examples and Comparative Examples, a portion where no fine particles were present was selected and a surface hardness was measured by an indentation method under the conditions below. The results are shown in Tables 1 to 5.

Measuring device: PICODENTOR HM-500 (Fischer Instruments K.K.)
Indenter: Vickers indenter
Maximum indentation depth: 10% or less of the thickness of the coating film (the thickness of the AG layer)

(State of Fine Particles)

For the antiglare films of Examples and Comparative Examples, the state of distribution of organic fine particles was observed by optical microscopy. The results are shown in Tables 1 to 3. It should be noted that when organic fine particles are distributed densely in some portions and sparsely in other portions, the samples are evaluated as "0", and when organic fine particles are not distributed in such a manner that the organic fine particles are distributed densely in some portions and sparsely in other portions, and the organic fine particles are uniformly distributed, the samples are evaluated as "x".

Figure 15:
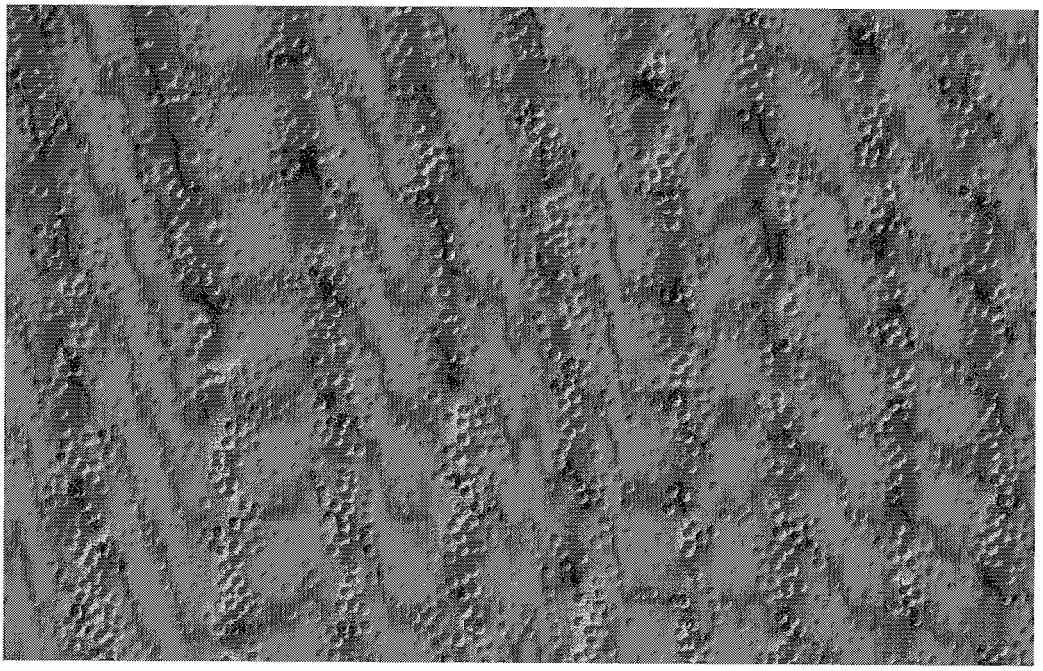
FIG. 15 is a transmission differential interference image of an antiglare film of Example 1.
Figure 16:
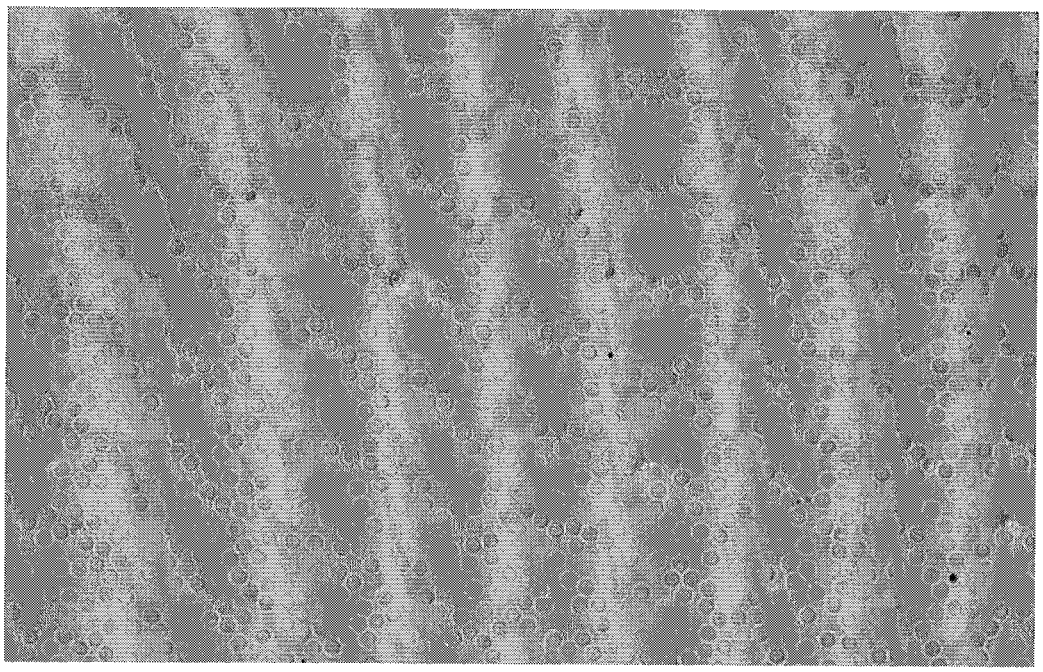
FIG. 16 is a transmission differential interference image of an antiglare film of Comparative Example 5.

Furthermore, among Examples 1 to 10 and Comparative Examples 1 to 5, transmission differential interference images of the antiglare films of Example 1 and Comparative Example 5 are shown in FIGS. 15 and 16, respectively, as representative examples.

The observation conditions were as follows.

Observation conditions: Optical microscope BX51 produced by Olympus Corporation, magnification 20 times, transmission image (Newton Rings)

Next, each antiglare film was placed on a black acrylic plate so that the antiglare layer surface was in contact with the black acrylic plate. Next, a load of 300 g/cm² was applied from the surface opposite the antiglare layer and the presence or absence of Newton rings was evaluated by visual observation. The results are shown in Tables 1 to 5.

(Glare)

An acrylic plate was disposed on the front surface of a notebook-type personal computer (PC) including a 13-inch liquid crystal display, with an air layer therebetween. Each optical film was bonded on the liquid crystal display side of the acrylic plate, with a tackiness agent therebetween. Next, monochromatic white color was displayed on the liquid crystal display to evaluate whether glare occurred or not. The results are shown in Tables 1 to 5.

TABLE 1

| | | Example 1 | Example 2 | Example 3 | Example 4 | Example 5 | Example 6 |
|---|---|---|---|---|---|---|---|
| Filler | Type | Acryl/styrene copolymer | Acryl/styrene copolymer | Acryl/styrene copolymer | Acryl/styrene copolymer | Acryl/styrene copolymer | Acryl/styrene copolymer |
| | Refractive index | 1.515 | 1.510 | 1.525 | 1.500 | 1.545 | 1.515 |
| | Average particle diameter (μm) | 5.5 | 5.5 | 5.5 | 5.5 | 2.5 | 8 |
| | Added amount (parts by weight) | 10 | 10 | 10 | 10 | 15 | 15 |
| Polymer | Added amount (parts by weight) | 10 | 10 | 10 | 10 | 10 | 10 |
| Structure | Layer | Antiglare layer single | Antiglare layer single | Antiglare layer single | Antiglare layer single | Antiglare layer single | Antiglare layer single |
| | Thickness of antiglare layer (μm) | 13.2 | 16.3 | 9.4 | 8.8 | 8.1 | 17.3 |
| Ratio R (%) | Particle diameter/film thickness | 41.7 | 33.7 | 58.5 | 62.5 | 31.0 | 46.2 |
| Surface roughness | RΔq | 0.017 | 0.015 | 0.019 | 0.023 | 0.025 | 0.025 |
| | Ra (μm) | 0.073 | 0.065 | 0.075 | 0.112 | 0.068 | 0.139 |
| | RSm (mm) | 0.061 | 0.066 | 0.078 | 0.093 | 0.076 | 0.102 |

TABLE 1-continued

|  |  | Example 1 | Example 2 | Example 3 | Example 4 | Example 5 | Example 6 |
|---|---|---|---|---|---|---|---|
| Optical characteristics | Opacity | 0.59 | 0.48 | 0.65 | 0.84 | 1.10 | 0.46 |
|  | Antiglare property (Evaluation 1) | A | B | A | A | B | B |
| Martens hardness (N/mm$^2$) |  | — | — | — | — | — | — |
| State of fine particles |  | ○ | ○ | ○ | ○ | ○ | ○ |
| Antiglare property (Evaluation 2) |  | a | a | a | b | a | b |

TABLE 2

|  |  | Example 7 | Example 8 | Example 9 | Example 10 | Example 11 | Example 12 |
|---|---|---|---|---|---|---|---|
| Filler | Type | Acryl/styrene copolymer | Acryl/styrene copolymer | Acryl/styrene copolymer | Acryl/styrene copolymer | Acryl/styrene copolymer | Acryl/styrene copolymer |
|  | Refractive index | 1.510 | 1.510 | 1.510 | 1.510 | 1.515 | 1.515 |
|  | Average particle diameter (μm) | 4.5 | 4.5 | 4.5 | 4.5 | 5.5 | 5.5 |
|  | Added amount (parts by weight) | 15 | 15 | 15 | 15 | 10 | 10 |
| Polymer | Added amount (parts by weight) | 3 | 5 | 15 | 20 | 10 | 10 |
| Structure | Layer | Antiglare layer single | Antiglare layer single | Antiglare layer single | Antiglare layer single | Antiglare layer + low-reflection layer | Antiglare layer + antireflection layer |
|  | Thickness of antiglare layer (μm) | 11 | 11 | 11 | 11 | 13.2 | 13.2 |
| Ratio R (%) Particle diameter/film thickness |  | 40.9 | 40.9 | 40.9 | 40.9 | 41.7 | 41.7 |
| Surface roughness | RΔq | 0.025 | 0.025 | 0.023 | 0.025 | 0.015 | 0.014 |
|  | Ra (μm) | 0.123 | 0.080 | 0.091 | 0.103 | 0.067 | 0.064 |
|  | RSm (mm) | 0.08 | 0.078 | 0.057 | 0.6 | 0.065 | 0.063 |
| Optical characteristics | Opacity | 0.80 | 0.70 | 0.78 | 0.76 | 0.40 | 0.30 |
|  | Antiglare property | A | A | A | A | A | A |
| Martens hardness (N/mm$^2$) |  | 305 | 302 | 263 | 242 | — | — |
| State of fine particles |  | ○ | ○ | ○ | ○ | ○ | ○ |

TABLE 3

|  |  | Comparative Example 1 | Comparative Example 2 | Comparative Example 3 | Comparative Example 4 | Comparative Example 5 | Comparative Example 6 |
|---|---|---|---|---|---|---|---|
| Filler | Type | Acryl/styrene copolymer | Acryl/styrene copolymer | Acryl/styrene copolymer | Acryl/styrene copolymer | Acrylic particles | Acryl/styrene copolymer |
|  | Refractive index | 1.515 | 1.515 | 1.510 | 1.510 | 1.495 | 1.560 |
|  | Average particle diameter (μm) | 5.5 | 1.8 | 4.5 | 4.5 | 8 | 6 |
|  | Added amount (parts by weight) | 10 | 15 | 15 | 15 | 10 | 10 |
| Polymer | Added amount (parts by weight) | 10 | 10 | 0 | 25 | 5 | 0 |
| Structure | Layer | Antiglare layer single | Antiglare layer single | Antiglare layer single | Antiglare layer single | Antiglare layer single | Antiglare layer single |
|  | Thickness of antiglare layer (μm) | 7.3 | 8 | 11 | 11 | 18 | 8 |
| Ratio R (%) Particle diameter/film thickness |  | 75.3 | 22.5 | 40.9 | 40.9 | 44.4 | 75.0 |
| Surface roughness | RΔq | 0.031 | 0.031 | 0.035 | 0.032 | 0.008 | 0.017 |
|  | Ra (μm) | 0.151 | 0.121 | 0.180 | 0.152 | 0.05 | 0.192 |
|  | RSm (mm) | 0.144 | 0.191 | 0.189 | 0.176 | 0.1 | 0.175 |
| Optical characteristics | Opacity | 1.18 | 1.49 | 1.20 | 1.34 | 0.40 | 1.20 |
|  | Antiglare property (Evaluation 1) | A | A | A | A | C | B |
| Martens hardness (N/mm$^2$) |  | — | — | 307 | 219 | — | — |
| State of fine particles |  | ○ | ○ | ○ | ○ | X | ○ |
| Antiglare property (Evaluation 2) |  | a | a | a | a | c | a |

TABLE 4

|  |  | Example 13 | Example 14 | Example 15 | Example 16 | Example 17 |
|---|---|---|---|---|---|---|
| Filler | Type | Acrylic particles | Acryl/styrene copolymer | Acryl/styrene copolymer | Acryl/styrene copolymer | Acrylic particles |
|  | Refractive index | 1.525 | 1.525 | 1.525 | 1.525 | 1.56 |
|  | Average particle diameter (μm) | 5 | 5 | 5 | 4 | 5 |
|  | Added amount (parts by weight) | 9 | 9 | 9 | 9 | 9 |
| Polymer | Added amount (parts by weight) | 10 | 10 | 10 | 5 | 10 |
| Structure | Layer | Antiglare layer single | Antiglare layer single | Antiglare layer + antireflection layer | Antiglare layer single | Antiglare layer single |
|  | Thickness of antiglare layer (μm) | 8 | 8 | 8 | 6.4 | 8 |
| Ratio R (%) Particle diameter/film thickness |  | 62.5 | 62.5 | 62.5 | 62.5 | 62.5 |
| Surface roughness | RΔq | 0.017 | 0.0187 | 0.0179 | 0.028 | 0.0187 |
|  | Ra (μm) | 0.7 | 0.089 | 0.08 | 0.14 | 0.089 |
|  | RSm (mm) | 0.11 | 0.06 | 0.058 | 0.08 | 0.1 |
| Presence or absence of anti-Newton rings |  | Absent | Absent | Absent | Absent | Absent |
|  | Glare | Not occurred | Not occurred | Not occurred | Not occurred | Not occurred |
|  | Martens hardness | — | — | — | 225 | — |

TABLE 5

|  |  | Comparative Example 7 | Comparative Example 8 | Comparative Example 9 | Comparative Example 10 |
|---|---|---|---|---|---|
| Filler | Type | Acrylic particles | Acryl/styrene copolymer | Acryl/styrene copolymer | Acryl/styrene copolymer |
|  | Refractive index | 1.49 | 1.57 | 1.525 | 1.515 |
|  | Average particle diameter (μm) | 5 | 5 | 4 | 5.5 |
|  | Added amount (parts by weight) | 10 | 10 | 10 | 10 |
| Polymer | Added amount (parts by weight) | 10 | 2 | 5 | 10 |
| Structure | Layer | Antiglare layer single | Antiglare layer single | Antiglare layer single | Antiglare layer single |
|  | Thickness of antiglare layer (μm) | 10 | 11 | 5 | 19 |
| Ratio R (%) Particle diameter/film thickness |  | 50.0 | 45.5 | 80.0 | 28.9 |
| Surface roughness | RΔq | 0.009 | 0.04 | 0.035 | Curling significantly occurred and evaluation could not be performed. |
|  | Ra (μm) | 0.023 | 0.16 | 0.16 |  |
|  | RSm (mm) | 0.15 | 0.15 | 0.2 |  |
| Presence or absence of anti-Newton rings |  | Present | Absent | Absent |  |
|  | Glare | Not occurred | Occurred | Occurred |  |
|  | Martens hardness | — | — | 215 |  |
|  | State of fine particles | x | — | — |  |

The following can be understood from Tables 1 to 5.

In Examples 1 to 17, the polymer content in the resin is 3% by weight or more and 20% by weight or less, the average particle diameter of fine particles is 2.4 μm or more and 8 μm or less, and the average film thickness of the antiglare layer is 6.4 μm or more and 18 μm or less. Accordingly, the arithmetic mean roughness Ra is within the range of 0.03 μm to 0.15 μm and the root-mean-square slope RΔq is within the range of 0.01 to 0.03. Thus, both the contrast and the antiglare property can be achieved.

Furthermore, in Examples 10 and 12, since a low-reflection layer and an antireflection layer are formed on the antiglare layer, respectively, the opacity can be reduced as compared with Example 1.

In Comparative Example 1, the dry film thickness of the antiglare layer is out of the range of 8 to 18 μm, and the ratio R is out of the range of 30% to 70%. Thus, the arithmetic mean roughness Ra is out of the range of 0.03 μm to 0.15 μm, and the root-mean-square slope RΔq is out of the range of 0.01 to 0.03. Accordingly, although good antiglare property can be achieved, the opacity is increased.

In Comparative Example 2, the particle diameter is out of the range, and the ratio R is out of the range of 30% to 70%. Thus, the root-mean-square slope RΔq is out of the range of 0.01 to 0.03. Accordingly, although good antiglare property can be achieved, the opacity is increased.

In Comparative Example 3, the polymer content is out of the range of 3% by weight to 20% by weight. Accordingly, the arithmetic mean roughness Ra is out of the range of 0.03 μm to 0.15 μm, and the root-mean-square slope RΔq is out of the range of 0.01 to 0.03. Accordingly, although good antiglare property can be achieved, the opacity is increased.

In Comparative Example 4, the polymer content is out of the range of 3% by weight to 20% by weight. Accordingly, the arithmetic mean roughness Ra is out of the range of 0.03 μm to 0.15 μm, and the root-mean-square slope RΔq is out of the range of 0.01 to 0.03. Accordingly, although good antiglare property can be achieved, the opacity is increased. In addition, since the polymer content is excessively large, the Martens hardness is low, compared with Examples 7 to 10.

In Comparative Example 5, since the acrylic particles are used as organic fine particles, the fine particles are not distributed in such a manner that the fine particles are distributed densely in some portions and sparsely in other portions. Accordingly, the arithmetic mean roughness Ra is out of the range of 0.03 μm to 0.15 μm, and the root-mean-square slope RΔq is out of the range of 0.01 to 0.03. Accordingly, although the opacity is decreased, the antiglare property is poor.

In Comparative Example 6, since no polymer is incorporated, the arithmetic mean roughness Ra is out of the range of 0.03 μm to 0.15 μm. Accordingly, the opacity is increased.

In Comparative Example 7, since the acrylic particles are used as organic fine particles, the fine particles are not distributed in such a manner that the fine particles are distributed densely in some portions and sparsely in other portions. Accordingly, the arithmetic mean roughness Ra is out of the range of 0.03 μm to 0.15 μm, and the root-mean-square slope RΔq is out of the range of 0.01 to 0.03. Accordingly, anti-Newton rings occur.

In Comparative Example 8, since the amount of polymer added is less than 3 parts by weight, the arithmetic mean roughness Ra is out of the range of 0.03 μm to 0.15 μm, and the root-mean-square slope RΔq is out of the range of 0.01 to 0.03. Accordingly, glare occurs.

In Comparative Example 9, the average film thickness is less than 6.5 μm, and the ratio R (particle diameter/film thickness) exceeds 70%. Accordingly, the arithmetic mean roughness Ra is out of the range of 0.03 μm to 0.15 μm, and the root-mean-square slope RΔq is out of the range of 0.01 to 0.03. Accordingly, glare occurs and, and the Martens hardness was decreased.

In Comparative Example 10, curling significantly occurred, and the antiglare film had a cylindrical shape in a static state. Accordingly, air bubbles were contained during bonding to the acrylic plate. Thus, the film did not reach the evaluation.

Figure 17:
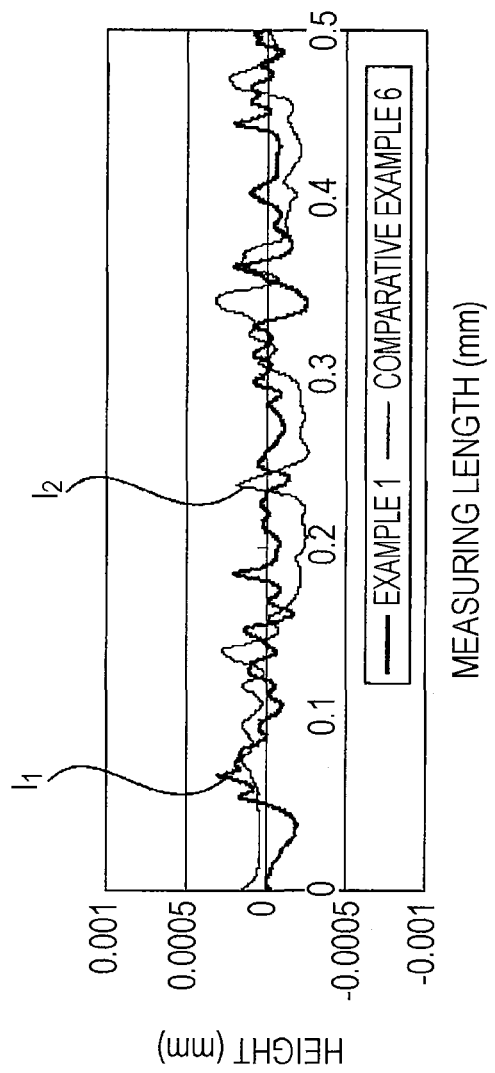
FIG. 17 is a graph showing a comparison of a cross-sectional profile of a roughness profile of Example 1 with that of Comparative Example 6.

FIG. 17 is a graph showing a comparison of a cross-sectional profile of a roughness profile of Example 1 with that of Comparative Example 6. Note that, in FIG. 17, curve $l_1$ shows the cross-sectional profile of a roughness profile of Example 1, and curve $l_2$ shows the cross-sectional profile of a roughness profile of Comparative Example 6. Ra and RΔq determined from the profiles are the values below, as described in the tables.

Example 1: Ra=0.073 (μm), RΔq=0.017
Comparative Example 6: Ra=0.192 (μm), RΔq=0.017

Figure 18:
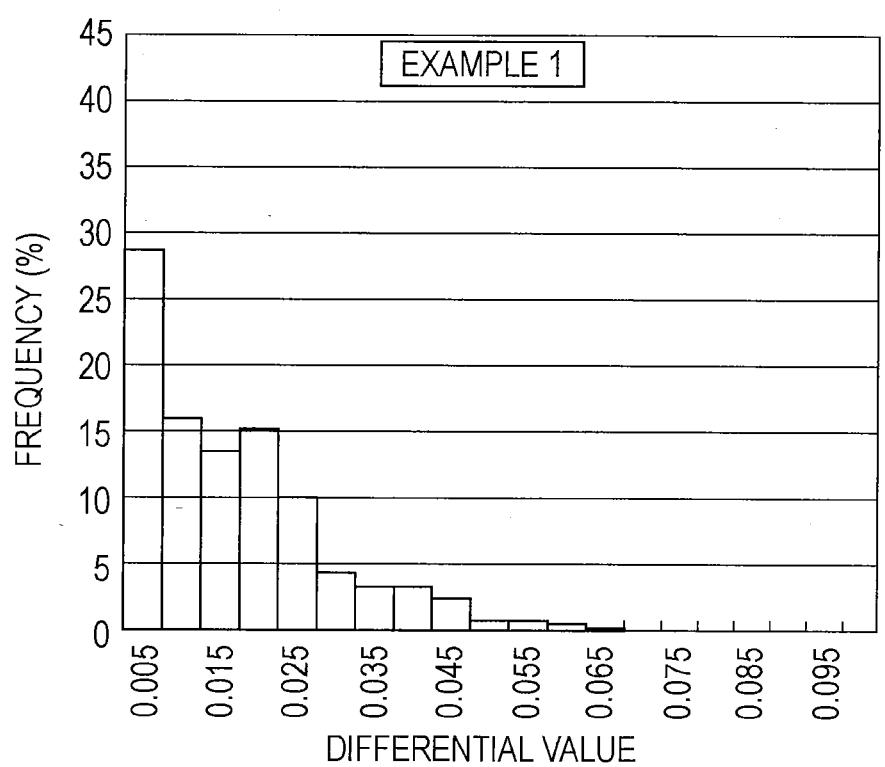
FIG. 18 is a graph showing a frequency of a slope (differential value) determined every 0.5 μm from measured values obtained from a primary profile of Example 1.
Figure 19:
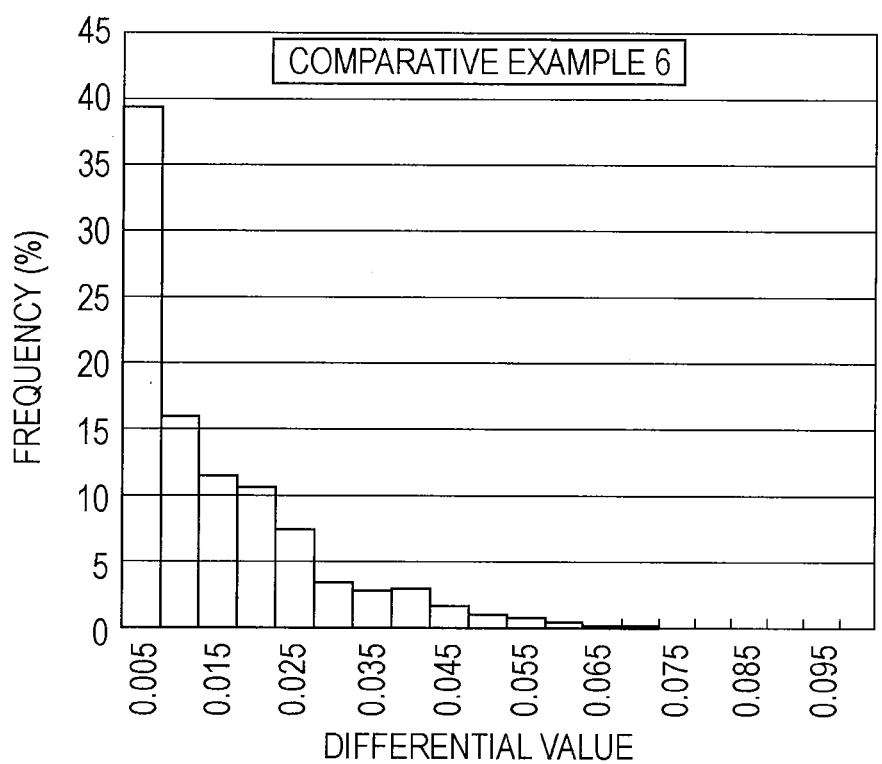
FIG. 19 is a graph showing a frequency of a slope (differential value) determined every 0.5 μm from measured values obtained from a primary profile of Comparative Example 6.

FIGS. 18 and 19 are graphs each showing a frequency of a slope (differential value) determined every 0.5 μm from measured values obtained from a primary profile. In Example 1, the frequency of a differential value of 0.01 or less is low, that is, the specular reflection intensity is low, as compared with Comparative Example 5. Thus, a film having a high antiglare property is obtained, though RΔq is the same value. In addition, in Example 1, the distribution is concentrated in the range of 0.01 to 0.03, and the profile is constituted by uniform, low-angle slopes compared with Comparative Example 6. The distribution (histogram) of the slope can be substantially substituted with Ra of a roughness parameter. The surface property typified by FIG. 18 can be obtained by controlling RΔq=0.01 to 0.03 and Ra=0.015 (μm) or less.

The numerical values, shapes, materials, structures, and the like described in the embodiments and Examples above are merely examples, and other numerical values, shapes, materials, structures, and the like, all of which are different from the above may be used according to need.

Furthermore, embodiments applied to optical films provided on display surfaces of liquid crystal displays and methods for manufacturing such optical films have been described. However, the present embodiments are not limited to this, and are applicable to optical films used on display surfaces of various display apparatuses such as cathode ray tube (CRT) displays, plasma display panels (PDPs), electro luminescence (EL) displays, and surface-conduction electron-emitter displays (SEDs), and to methods for manufacturing such optical films.

It should be understood that various changes and modifications to the presently preferred embodiments described herein will be apparent to those skilled in the art. Such changes and modifications can be made without departing from the spirit and scope of the present invention and without diminishing its intended advantages. It is therefore intended that such changes and modifications be covered by the appended claims.

EXPLANATION OF REFERENCE NUMERALS

1 antiglare film
2 liquid crystal panel
2a, 2b polarizer
3 backlight
4 antiglare polarizer
11 base member
12 antiglare layer
13 fine particle
14 low-refractive-index layer
15 hollow fine particle
16 multilayered antireflection layer
16L low-refractive-index layer
16H high-refractive-index layer

The invention claimed is:
1. An optical film comprising:
a base member; and
an optical layer provided on the base member, the optical layer including a coating material containing fine particles and a resin,
wherein the optical layer has an irregular shape on a surface thereof, the resin contains 3% by weight or more and 20% by weight or less of a polymer, an average particle diameter of the fine particles is 2.4 μm or more and 8 μm or less, and an average film thickness of the optical layer is 6.4 μm or more and 18 μm or less.

2. The optical film according to claim 1, wherein when the average film thickness of the optical layer is represented by T and the average particle diameter of the fine particles is represented by D, a ratio R (=D/T×100) is 30% or more and 70% or less.

3. The optical film according to claim 1, wherein the fine particles contain an acryl/styrene copolymer as a main component.

4. The optical film according to claim 1, wherein the refractive index of the fine particles is 1.50 or more and 1.56 or less.

5. The optical film according to claim 1, wherein an arithmetic mean roughness Ra of a roughness profile of the surface of the optical layer is 0.03 μm or more and 0.15 μm or less, and a root-mean-square slope RΔq thereof is 0.01 or more and 0.03 or less.

6. The optical film according to claim 1, wherein the resin contains 3% by weight or more and 20% by weight or less of a polymer and 80% by weight or more and 97% by weight or less of an oligomer and/or a monomer.

7. The optical film according to claim 6, wherein the resin contains 3% by weight or more and 20% by weight or less of a polymer and 80% by weight or more and 97% by weight or less of an oligomer.

8. An antiglare film comprising:

a base member; and an antiglare layer provided on the base member, the optical layer including a coating material containing fine particles and a resin, wherein the antiglare layer has an irregular shape on a surface thereof, the resin contains 3% by weight or more and 20% by weight or less of a polymer, an average particle diameter of the fine particles is 2.4 μm or more and 8 μm or less, and an average film thickness of the antiglare layer is 8 μM or more and 18 μm or less.

9. A polarizer with an optical layer, comprising:

a polarizer; and an optical layer provided on the polarizer, the optical layer including a coating material containing fine particles and a resin, wherein the optical layer has an irregular shape on a surface thereof, the resin contains 3% by weight or more and 20% by weight or less of a polymer, an average particle diameter of the fine particles is 2.4 μm or more and 8 μm or less, and an average film thickness of the optical layer is 6.4 μm or more and 18 μm or less.

10. A display apparatus comprising:

a display unit that displays an image; and an optical layer provided on a display surface side of the display unit, the optical layer including a coating material containing fine particles and a resin, wherein the optical layer has an irregular shape on a surface thereof, the resin contains 3% by weight or more and 20% by weight or less of a polymer, an average particle diameter of the fine particles is 2.4 μm or more and 8 μm or less, and an average film thickness of the optical layer is 6.4 μm or more and 18 μm or less.

11. A display apparatus comprising:

a display unit that displays an image;

a front surface member provided on a front surface side of the display unit; and an optical layer provided on at least one of the front surface side of the display unit and a rear surface side of the front surface member, the optical layer including a coating material containing fine particles and a resin, wherein the optical layer has an irregular shape on a surface thereof, the resin contains 3% by weight or more and 20% by weight or less of a polymer, an average particle diameter of the fine particles is 2.4 μm or more and 8 μm or less, and an average film thickness of the optical layer is 6.4 μm or more and 18 μm or less.

12. A display apparatus comprising:

a display unit that displays an image;

a rear surface member provided on a rear surface side of the display unit; and an optical layer provided on at least one of the rear surface side of the display unit and a front surface side of the rear surface member, the optical layer including a coating material containing fine particles and a resin, wherein the optical layer has an irregular shape on a surface thereof, the resin contains 3% by weight or more and 20% by weight or less of a polymer, an average particle diameter of the fine particles is 2.4 μm or more and 8 μm or less, and an average film thickness of the optical layer is 6.4 μm or more and 18 μm or less.

\* \* \* \* \*